United States Patent
Sato

(10) Patent No.: US 9,030,076 B2
(45) Date of Patent: May 12, 2015

(54) ELECTRICAL ROTARY MACHINE

(75) Inventor: Tomohiro Sato, Hove (GB)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 258 days.

(21) Appl. No.: 13/642,231

(22) PCT Filed: May 17, 2011

(86) PCT No.: PCT/JP2011/061257
§ 371 (c)(1),
(2), (4) Date: Oct. 19, 2012

(87) PCT Pub. No.: WO2011/152197
PCT Pub. Date: Dec. 8, 2011

(65) Prior Publication Data
US 2013/0038169 A1 Feb. 14, 2013

(30) Foreign Application Priority Data

Jun. 2, 2010 (JP) .................................. 2010-126807
Jun. 2, 2010 (JP) .................................. 2010-126808

(51) Int. Cl.
*H02K 1/14* (2006.01)
*H02K 1/18* (2006.01)

(52) U.S. Cl.
CPC ................ *H02K 1/185* (2013.01); *H02K 1/148* (2013.01); *H02K 2213/03* (2013.01)

(58) Field of Classification Search
None
See application file for complete search history.

(56) References Cited

U.S. PATENT DOCUMENTS

| | | | |
|---|---|---|---|
| 5,729,072 A * | 3/1998 | Hirano et al. | 310/216.009 |
| 6,470,984 B1 * | 10/2002 | Nakajima et al. | 180/65.26 |
| 6,583,531 B1 * | 6/2003 | Asano et al. | 310/429 |
| 6,856,064 B2 * | 2/2005 | Masumoto et al. | 310/216.008 |
| 7,595,578 B2 * | 9/2009 | Aramaki et al. | 336/130 |

(Continued)

FOREIGN PATENT DOCUMENTS

| | | |
|---|---|---|
| CN | 201015173 Y | 1/2008 |
| CN | 101171733 A | 4/2008 |

(Continued)

OTHER PUBLICATIONS

Office Action issued on May 23, 2014, by the Chinese Patent Office in corresponding Chinese Patent Application No. 201180024659.5 and an English translation of the Office Action. (32 pages).

(Continued)

*Primary Examiner* — Tran Nguyen
(74) *Attorney, Agent, or Firm* — Buchanan Ingersoll & Rooney PC

(57) ABSTRACT

An electrical rotary machine comprises a stator having a plurality of split cores arranged in an annular shape and a holding ring capable of retaining the plurality of split cores on an inner circumferential surface so that a surface pressure is applied to an outer circumferential surface of the split cores. The electrical rotary machine further comprises a rotor provided radially inside of the stator facing the split cores in a radial direction and rotatable relative to the stator. Each of the split cores includes a tooth portion extending in an radial direction and a back yoke portion extending in a circumferential direction. Each of the split cores further includes a slit penetrating an outer circumferential periphery of the back yoke portion except for either circumferential end of the back yoke portion.

14 Claims, 15 Drawing Sheets

(56) References Cited

U.S. PATENT DOCUMENTS

| | | | |
|---|---|---|---|
| 2002/0195885 A1* | 12/2002 | Tsuneyoshi et al. | 310/43 |
| 2009/0039727 A1* | 2/2009 | Kato | 310/216 |
| 2009/0066183 A1* | 3/2009 | Aramaki et al. | 310/217 |
| 2010/0007236 A1* | 1/2010 | Sano et al. | 310/216.135 |

FOREIGN PATENT DOCUMENTS

| | | |
|---|---|---|
| JP | 60-84934 A | 5/1985 |
| JP | 2005-51941 A | 2/2005 |
| JP | 3666727 B2 | 6/2005 |
| JP | 2007-104830 A | 4/2007 |
| JP | 2007-129835 A | 5/2007 |
| JP | 2008-104325 A | 5/2008 |
| JP | 2008-141805 A | 6/2008 |
| JP | 2008-220112 A | 9/2008 |
| JP | 2009-136101 A | 6/2009 |
| JP | 2010-114951 A | 5/2010 |

OTHER PUBLICATIONS

International Search Report (PCT/ISA/210) issued on Aug. 2, 2011, by the Japanese Patent Office as the International Searching Authority for International Application No. PCT/JP2011/061257.

* cited by examiner

US 9,030,076 B2

ELECTRICAL ROTARY MACHINE

TECHNICAL FIELD

The present invention relates to an electrical rotary machine adapted to drive a rotor with a core of a stator electrified.

BACKGROUND OF THE TECHNOLOGY

For instance, Patent Document 1 discloses a known technology with respect to an electrical rotary machine. The electrical rotary machine disclosed in the related art comprises; a stator formed with a plurality of cores, each of which is wound with a coil, are held in an inner circumferential surface of a circular cylindrical portion of a holding ring in the form of an annular shape; and a rotor formed in a manner radially facing the stator. Such electrical rotary machine is mainly for use as a motor that drives wheels of hybrid vehicles. The plurality of cores are fixed to the inner circumferential surface of the circular cylindrical portion of the holding ring while keeping the cores arranged in an annular juxtaposition, and then the holding ring is attached to an inside of a motor housing.

PRIOR ART DOCUMENT

Patent Document

Patent Document 1: JP-B-3666727

SUMMARY OF THE INVENTION

Problems to be Solved by the Invention

In the above electrical rotary machine disclosed in Patent Document 1, a plurality of split cores 6 are fixed by press fitting to the inner circumference of the circular cylindrical portion of the holding ring. FIG. 16 depicts how the stress is generated in each of the split cores 6 when the plurality of split cores 6 are attached to the inner circumferential surface of the circular cylindrical portion 51 of the holding ring 5 of the stator while in annular juxtaposition. Each of the split cores 6 includes; a tooth portion 61 around which a coil (not depicted) is wound; and a back yoke portion 62 connected to the tooth portion 61 at a radially outward position. Adjoining pairs of split cores 6 are pressingly fitted to the inner circumference of the circular cylindrical portion 51 of the holding ring 5 with the back yoke portions 62 thereof abutting on each other at their circumferential ends, while a predetermined interference (the outer diameter of the split core 6 minus the inner diameter of the circular cylindrical portion 51 of the holding ring 5) is secured.

As depicted in FIG. 16, due to the press fitting of the split cores 6 to the circular cylindrical portion 51 of the holding ring 5, an outer circumference of each of the back yoke portion 62 is applied from the inner circumference of the circular cylindrical portion 51 of the holding ring 5 a substantially uniform pressing force (surface pressure) directed radially inward. In addition, both ends of the back yoke portion 62 are applied from the back yoke portions 62 of the adjoining split cores 6 a pressing force directed in the circumferential direction. Accordingly, a compressive stress is easily generated in the back yoke portion 62.

Members of the electrical rotary machine have dimensional irregularities, and thus the above-described interference is varied in accordance with such irregularities. When, by taking such dimensional irregularities into account, a dimension setting for each member of the electrical rotary machine is performed such that the above-described predetermined interference is maintained even in the worst arrangement, and such dimension setting results in an increase in the interference, there will be an increase in the surface pressure applied to the outer circumference of the back yoke portion 62 from the inner circumference of the circular cylindrical portion 51 of the holding ring 5. If the stress generated in the back yoke portion 62 becomes excessive, there will be an increase in iron loss (iron loss due to stress) within the back yoke portion 62, which will lead to reduction in the efficiency of the electrical rotary machine. In addition, since the split cores 6 each are formed by layering a plurality of thin electromagnetic steel plates, buckling of the back yoke portion 62 (i.e., bending deformation of the back yoke portion 62 in the axial direction due to the compressive load) may be generated, and the electrical rotary machine may be damaged.

Besides the above-described press fitting under a normal temperature, shrink fitting is another method of fixing the split cores 6 to the inner circumference of the circular cylindrical portion 51 of the holding ring 5. According to this method, the holding ring 5 is heated such that the inner diameter of the circular cylindrical portion 51 thereof is increased, and the plurality of split cores 6 annularly juxtaposed are fitted into the circular cylindrical portion 51. Subsequently, the holding ring 5 is cooled such that the inner diameter of the circular cylindrical portion 51 thereof is reduced, and the plurality of split cores 6 are then fixed to the inner circumference of the circular cylindrical portion 51 of the holding ring 5. However, even with this method, when the interference between the split cores 6 and the circular cylindrical portion 51 of the cooled holding ring 5 is great, the iron loss within the back yoke portion 62 will be increased due to the excessive stress generated in the back yoke portion 62 and the efficiency of the electrical rotary machine may be reduced or the electrical rotary machine may be damaged due to the buckling of the back yoke portion 62, as is the case when the pressing fitting is employed.

In order for the split cores 6 to be firmly attached to the circular cylindrical portion 51 of the holding ring 5, an interference of a predetermined level or more is required to be secured between the split cores 6 and the circular cylindrical portion 51 of the holding ring 5. On the other hand, when the interference is great, there will be an increase in the surface pressure applied to the outer circumference of the back yoke portion 62 from the inner circumference of the circular cylindrical portion 51 of the holding ring 5, and also in the stress generated in the back yoke portion 62. In other words, there have been problems contradictory to each other: maintenance of the holding power of the holding ring 5 for holding the split cores 6 is not compatible with the reduction in the efficiency of the electrical rotary machine due to the increase in the iron loss within the back yoke portion 62, or with the damages to the electrical rotary machine due to the buckling of the back yoke portion 62.

The surface pressure applied to the outer circumference of the back yoke portion 62 from the inner circumference of the circular cylindrical portion 51 of the holding ring 5 is reducible by reducing the thickness of the circular cylindrical portion 51 of the holding ring 5. However, when the thickness of the circular cylindrical portion 51 of the holding ring 5 is reduced, the circular cylindrical portion 51 of the holding ring 5 may be ruptured when the plurality of split cores 6 are attached to the inner circumference of the circular cylindrical portion 51 of the holding ring 5 by press fitting or shrink fitting.

Completed in view of the above circumstances, this invention serves to provide an electrical rotary machine that: maintains a holding power of a holding ring for holding split cores; reduces iron loss within the cores due to a surface pressure from the holding ring; and prevents buckling of the cores.

Means for Solving the Problem

For a solution to the problems described above, the structure of the present invention comprises: a rotor rotatably attached to a housing; and a stator provided at a radially outward position to oppose to the rotor including: a holding ring including a circular cylindrical portion and attached to the housing; and a plurality of split cores formed by layering core plates made of electromagnetic steel plates and fixed to an inner circumference of the circular cylindrical portion, and around each of which a coil is wound. Each of the split cores includes: a tooth portion extending in a radial direction while being attached to the holding ring, a coil being wound around the tooth portion; and a back yoke portion connected to the tooth portion at a radially outward position and extending in a circumferential direction. Also, the plurality of split cores are fittably attached to the inner circumference of the circular cylindrical portion of the holding ring by press fitting or shrink fitting with an interference interposed so as to apply a surface pressure thereto, while being annularly disposed with end surfaces of the adjoining back yoke portions abutting on each other. Additionally, a slit is provided at the back yoke portion of each of the split cores and penetrates therethrough except for either circumferential end of the back yoke portion.

FORMS FOR PRACTICING THE INVENTION

Figure 1:
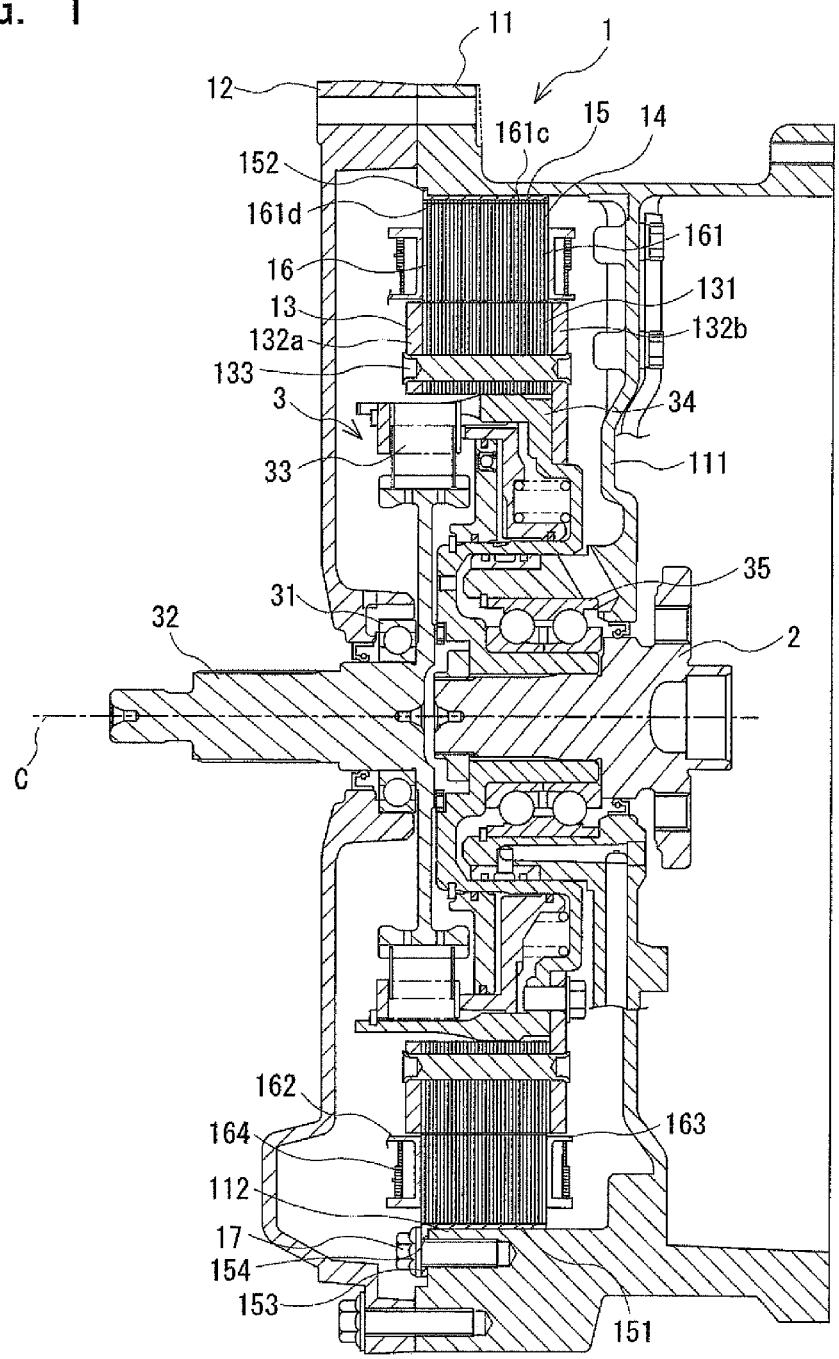
FIG. 1 is a cross sectional view depicting a wheel driving system of a hybrid vehicle in which an electrical rotary machine of a first and second exemplary embodiment according to an aspect of the invention is included.

An electrical rotary machine according to a first exemplary embodiment of the invention will be described with reference to FIGS. 1 to 3. The electrical rotary machine 1 is a synchronous motor for use in driving of wheels of hybrid vehicles. In FIG. 1, the left side thereof may be referred to as an anterior side of the electrical rotary machine 1 and a clutch 3 while the right side thereof may be referred to as a posterior side of the electrical rotary machine 1 and the clutch 3. However, these references have nothing to do with the directions in an actual vehicle. Moreover, when a term "rotary axis direction" or "axial direction" is used in this description, the term shall refer to a direction following a rotary axis C of the electrical rotary machine 1, i.e., a right and left direction in FIG. 1, unless otherwise specified. Further, in FIGS. 2 and 3, the depictions of bobbins 162 and 163 and a coil 164 fittably engaged with a split core 16 are omitted.

As depicted in FIG. 1, a motor housing 11 (equivalent to the "housing" according to an aspect of the invention) internally houses a rotor 13 and a stator 14 (i.e., components of the electrical rotary machine 1), and is anteriorly closed by a motor cover 12. The motor cover 12 is anteriorly attached with an engine of a vehicle (not depicted) while a transmission (not depicted) is located posterior to the motor housing 11. The clutch 3, which is a normally-closed multiplate wet clutch, is interposed between the rotor 13 and the engine. The electrical rotary machine 1 is connected to a driving wheel (not depicted) of the vehicle via the transmission, and the driving force by the electrical rotary machine 1 is transmitted to the driving wheel.

When the vehicle having the electrical rotary machine 1 runs with use of the engine, the engine rotates the driving wheel via the transmission. At this time, the electrical rotary machine 1 may be activated to support the engine. On the other hand, when the vehicle runs with use of the electrical rotary machine 1, the electrical rotary machine 1 rotates the driving wheel via the transmission. At this time, by releasing the clutch 3, the engine and the electrical rotary machine 1 are disconnected from each other. In addition, the electrical rotary machine 1, driven by the engine via the clutch 3, also serves as a power generator.

An inner circumferential end of the motor cover 12 is attached with an input shaft 32 of the clutch 3 via a bearing 31 such that the input shaft 32 is rotatable about the rotary axis C. The rotary axis C is also a rotary axis of the engine, the electrical rotary machine 1 and a turbine shaft 2 of the transmission. The input shaft 32 is connected with a crank shaft of the engine. In addition, the input shaft 32 is connected with a clutch outer member 34 via an engagement portion 33 of the clutch 3. By engagement or disengagement of the engagement portion 33, the input shaft 32 and the clutch outer member 34 are connected with or disconnected from each other. The clutch outer member 34 is connected to the rotor 13 of the electrical rotary machine 1, and extends radially inward to be fitted to the turbine shaft 2 at its inner end while forming a spline. Further, a bearing device 35 is interposed between the clutch outer member 34 and a fixing wall 111 of the motor housing 11 such that the clutch outer member 34 and the motor housing 11 are rotatable relatively to each other.

The rotor 13 of the electrical rotary machine 1 is rotatably attached to the motor housing 11 via the clutch outer member 34. The rotor 13 is formed by: sandwiching a plurality of layered electromagnetic steel plates 131 with a pair of holding plates 132a and 132b; penetrating the electromagnetic steel plates 131 and the holding plates 132a and 132b with a fixing member 133; and crimping ends of the fixing member 133. Along a circumference of the rotor 13, a plurality of field pole magnets (not depicted) is disposed. The first holding plate 132b is attached to the clutch outer member 134. With this arrangement, the rotor 13 is connected to the clutch outer member 34.

An inner circumference of the motor housing 11 is attached with the stator 14 of the electrical rotary machine 1 such that the stator 14 is radially opposed to the rotor 13. As depicted in FIG. 2, the stator 14 is formed by fittably attaching a plurality of split cores 16 to an inner circumference of a holding ring 15 by shrink fitting with an interference interposed between one another. The split cores 16, which in use generate a rotating magnetic field, are fittably attached to the holding ring 15 while being annularly juxtaposed with a surface pressure applied thereto. The holding ring 15, which is formed by press-forming a steel plate, includes: a ring-shaped circular cylindrical portion 151; and an outer circumferential flange 152 connected to a first axial end of the circular cylindrical portion 151 and extending radially outward from the entire circumference of the circular cylindrical portion 151. At three positions, the outer circumferential flange 152 is provided with three attachment flanges 153 each further extending radially outward (see, FIG. 2).

Figure 2:
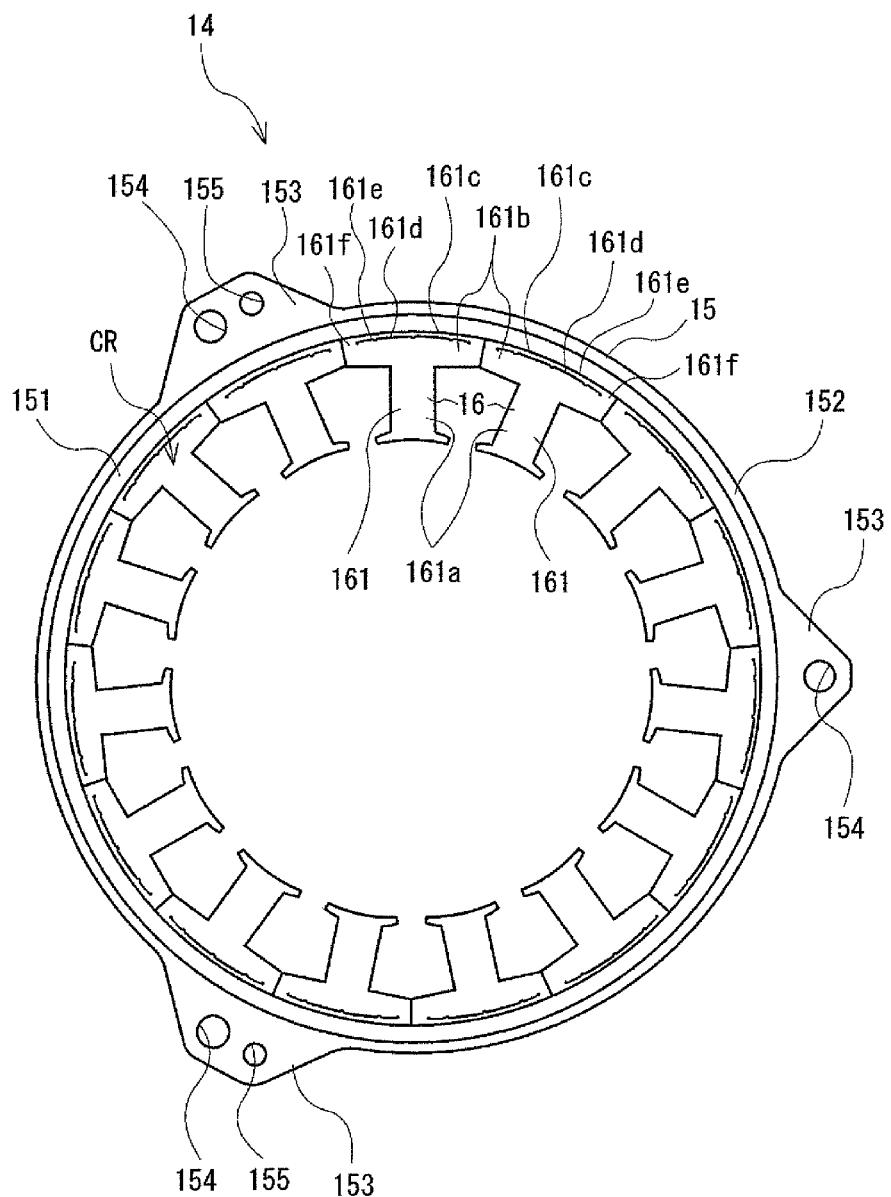
FIG. 2 is a top view depicting a stator of the electrical rotary machine according to the first exemplary embodiment.

The attachment flanges 153, which are for use in attaching the stator 14 to the motor housing 11, each have a single attachment hole 154 or have a single attachment hole 154 and a single positioning hole 155 all of which penetrates the attachment flanges 153 (see, FIG. 2). The portion of the holding ring 15 at which the circular cylindrical portion 151 is connected to the outer circumferential flange 152 and the attachment flanges 153 is formed as a curved surface that in its entire circumference exhibits a predetermined curvature.

On the other hand, each of the split cores 16 includes a tooth portion 161a formed by layering a plurality of silicon steel plates (electromagnetic steel plates). The tooth portion 161a is mounted with a pair of bobbins 162 and 163 such that the bobbins 162 and 163 are fittably engaged with each other while surrounding the outer circumference of the tooth portion 161a. Around the bobbins 162 and 163, the coil 164 for use in generating a rotating magnetic field is wound. The coil 164 wound around the tooth portion 161a is connected to an external inverter via a bus ring (not depicted). In the electrical rotary machine 1 having the above structure, a rotating magnetic field is generated in the stator 14 by feeding to the coil 164, for instance, three-phase alternating current, and the rotor 13 is rotated with respect to the stator 14 by the attractive force or the repulsive force generated from the rotating magnetic field.

Figure 3:
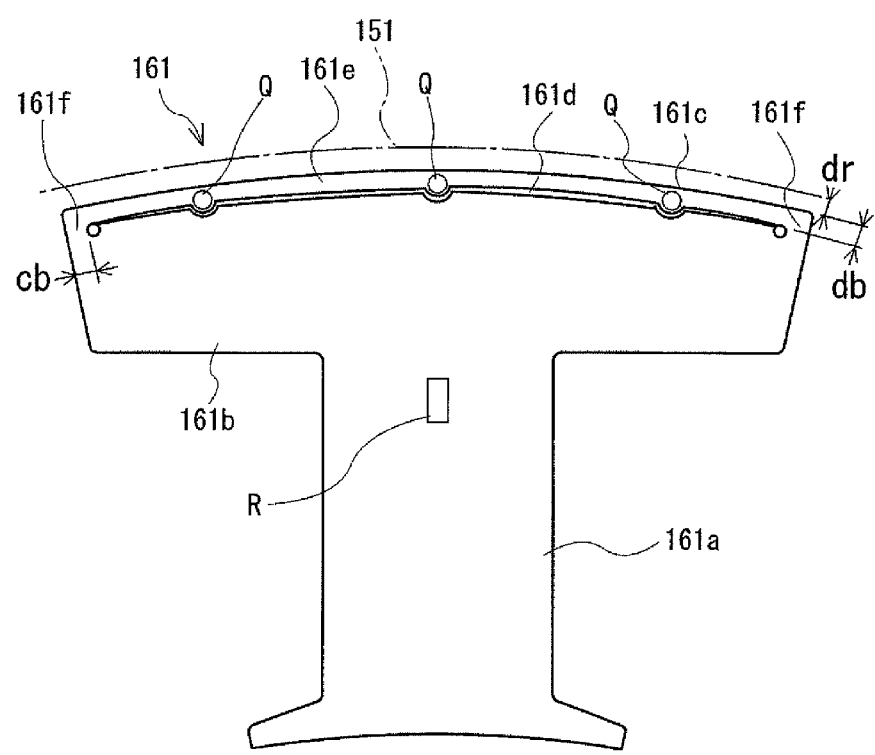
FIG. 3 is a top view depicting a single split core included in the stator depicted in FIG. 2.

The split cores 16 described above, which radially extend while being attached to the holding ring 15, each include: the tooth portion 161a around which the coil 164 is wound; and a back yoke portion 161b connected to the tooth portion 161a at an radially outward position and extending in a circumferential direction of the holding ring 15 (see, FIGS. 2 and 3). With the above arrangement, the split cores 16 each exhibit substantially a T shape. The split cores 16 attached to the holding ring 15 are annularly juxtaposed such that the back yoke portions 161b of the adjoining pairs thereof abut on each other at their ends, thereby forming a core line CR (see, FIG. 2).

In each of the split cores 16, a slit 161d is formed at least in a circumferentially central portion of the back yoke portion 161b such that the slit 161d becomes longitudinal in the circumferential direction. Specifically, in an outer circumferential periphery of the back yoke portion 161b which is located more radially inward by a predetermined distance than an outer circumference surface 161c of the back yoke portion 161b, the slit 161d extends in the circumferential direction except for either circumferential end of the back yoke portion 161b, and axially penetrates the back yoke portion 161b (see, FIGS. 2 and 3). The slit 161d is formed such that the circumferential length thereof is equal to or greater than a circumferential length of the tooth portion 161a. When the width of the slit 161d is smaller than the twice of the thickness (t) of the steel plate (e.g., t=0.3 mm, and the slit width is smaller than 0.6 mm), the slit 161d needs to be formed by etching or lasering. However, the width of the slit 161d, which is exemplarily set in a range of 0.6 mm to 0.8 mm, is relatively great and thus formed by pressing. The shape of the slit 161d provided to the back yoke portion 161b is not limited to the one depicted in FIG. 3, but may be any other shape as long as the slit 161d extends in the circumferential direction in the back yoke portion 161b.

The portion that extends from the slit 161d to the outer circumference surface 161c of the back yoke portion 161b (i.e., bridge portion 161e) receives the majority of the surface pressure applied from the circular cylindrical portion 151 of the holding ring 15 while the slit 161d serves as a buffer (see, FIG. 2). Therefore, in order to, for instance, halve the stress generated in the back yoke portion 161b except in the bridge portion 161e, the distance from the slit 161d to the outer circumference surface 161c of the back yoke portion 161b (i.e., a radial thickness db of the bridge portion 161e) is made equal to the distance from the inner circumference of the circular cylindrical portion 151 of the holding ring 15 to the outer circumference thereof (i.e., a thickness dr of the circular cylindrical portion 151 of the holding ring 15) (see, FIG. 3).

In addition, by forming the slit 161d so that the ratio of the radial thickness db of the bridge portion 161e to the thickness dr of the circular cylindrical portion 151 of the holding ring 15 is increased, which increases the strength of the bridge portion 161e, the majority of the surface pressure from the circular cylindrical portion 151 of the holding ring 15 is receivable at the bridge portion 161e, even if the surface pressure therefrom is increased. In this manner, the stress generated in the back yoke portion 161b except in the bridge portion 161e is reducible.

The slit 161d is configured such that portions that extend from ends of the slit 161d to ends of the back yoke portion 161b (hereinafter referred to as bridge leg portions 161f) are not ruptured by a running torque applied onto the split cores 16 when the electrical rotary machine 1 is rotated or by an axial force applied onto the split cores 16 when the vehicle have made, for instance, a lateral collision. In other words, a circumferential lengths cb of the bridge leg portions 161f are determined based on the above-described running torque and axial force (see, FIG. 3).

As described above, the bridge portion 161e receives the majority of the surface pressure applied from the circular cylindrical portion 151 of the holding ring 15 while the slit 161d serves as a buffer. Thus, in order to prevent the buckling of the bridge portion 161e (i.e., bending deformation of the bridge portion 161e in the axial direction due to the compressive load), the bridge portion 161e is subjected to dowel swaging at three positions Q (see, FIG. 3). In the portion of the split core 16 except for the bridge portion 161e, where the stress generation is reduced, it is sufficient to subject the split core 16 to dowel swaging singly at a substantially center position R (see, FIG. 3). On the other hand, when the bridge portion 161e is radially so thin that no dowel swaging is possible, electromagnetic steel plates layered on the bridge portion 161e may be jointed together by an adhesive.

As described above, the plurality of split cores 16 is attached to the inner circumference of the circular cylindrical portion 151 by shrink fitting. The holding ring 15 is heated up to a predetermined temperature such that the inner diameter of the holding ring 15 is expanded. By bringing the back yoke portions 161b of the split cores 16 into abutment on the heated circular cylindrical portion 151, the split cores 16 are inserted in the circular cylindrical portion 151 to be annularly juxtaposed therein. After the split cores 16 are inserted in the circular cylindrical portion 151, the holding ring 15 is cooled down and shrunk, thereby firmly holding the split cores 16 each.

Alternatively, the split cores 16 may be attached to the inner circumference of the holding ring 15 by press fitting under a normal temperature. When the split cores 16 are attached by press fitting to the inner circumference of the holding ring 15 to be held by the holding ring 15, an adhesive may be applied between the split cores 16 and the circular cylindrical portion 151 so as to increase the holding power of the holding ring 15. The holding ring 15 attached with the split cores 16 is fixed to the motor housing 11. After the attachment flanges 153 are brought into abutment on bosses 112 of the motor housing 11, attachment bolts 17 are inserted into the attachment holes 154 and screwed into the bosses 112. In this manner, the attachment flanges 153 are attached to the motor housing 11.

Figure 4A:
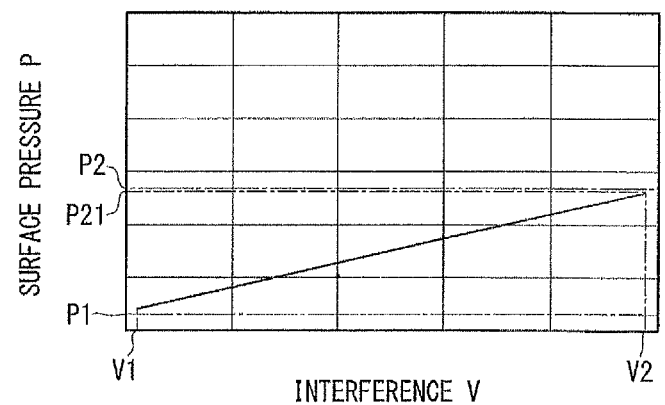
FIG. 4A is a view depicts a relationship between: an interference between a circular cylindrical portion of a holding ring and the split cores of the electrical rotary machine according to this exemplary embodiment; and a surface pressure.
Figure 4B:
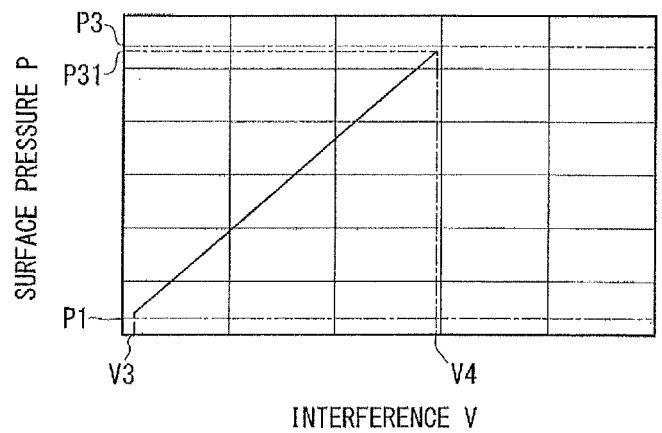
FIG. 4B is a view depicts a relationship between: an interference between a circular cylindrical portion of a holding ring and split cores of an electrical rotary machine according to a known technique; and a surface pressure.
Figure 5A:
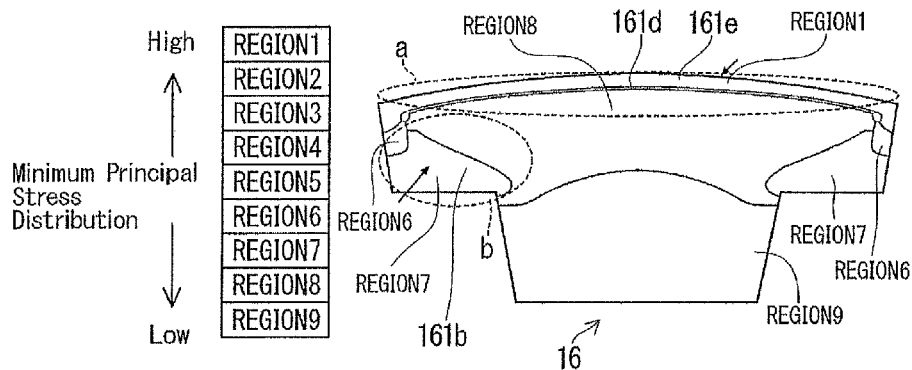
FIG. 5A, FIG. 5B and FIG. 5C are views respectively depict results obtained by analyzing by a finite element method (FEM) the minimum principal stress distribution, the magnetic flux density distribution and the iron loss density distribution generated when the split cores of the electrical rotary machine according to this exemplary embodiment are attached to the holding ring.
Figure 5B:
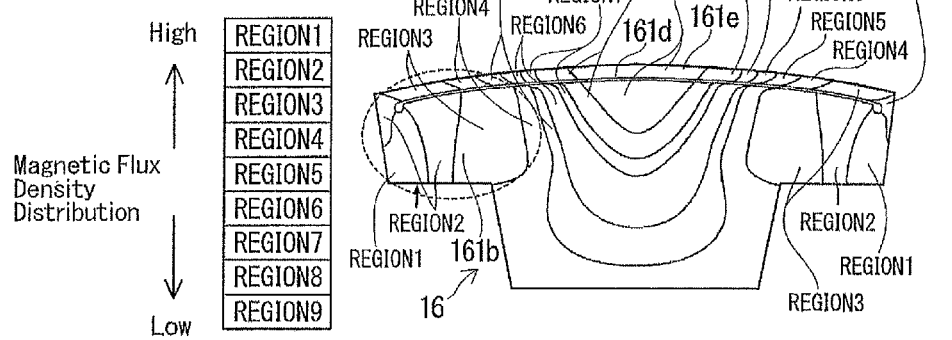
Figure 5C:
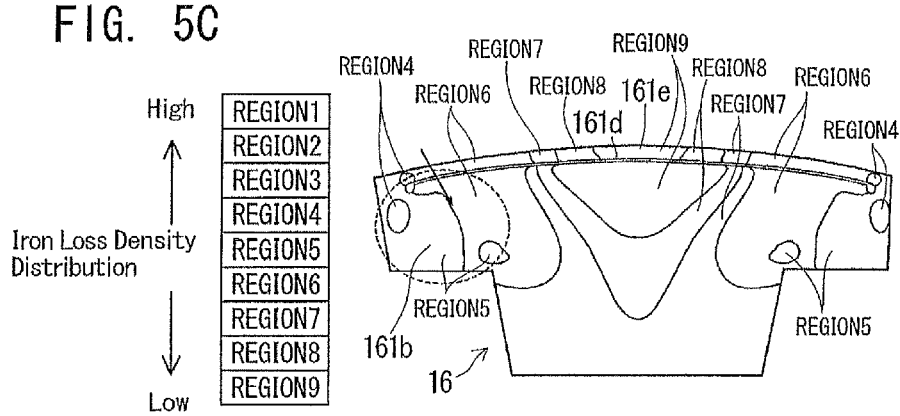
Figure 6A:
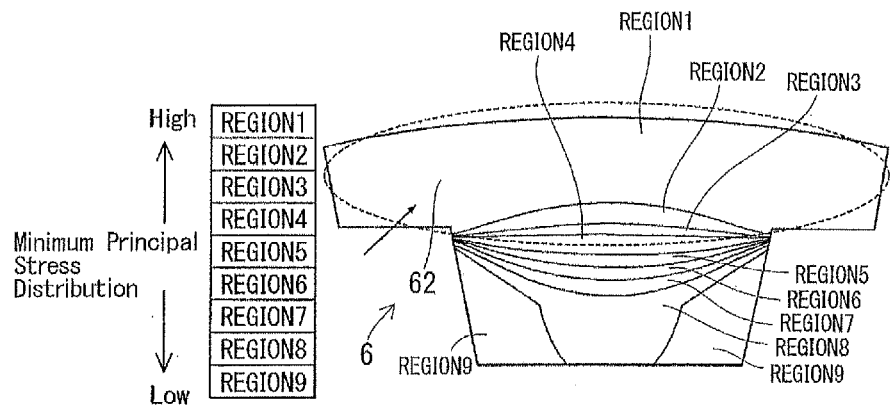
FIG. 6A, FIG. 6B and FIG. 6C are views respectively depict results obtained by analyzing by a finite element method (FEM) the minimum principal stress distribution, the magnetic flux density distribution and the iron loss density distribution generated when split cores of an electrical rotary machine according to a known technique are attached to the holding ring.
Figure 6B:
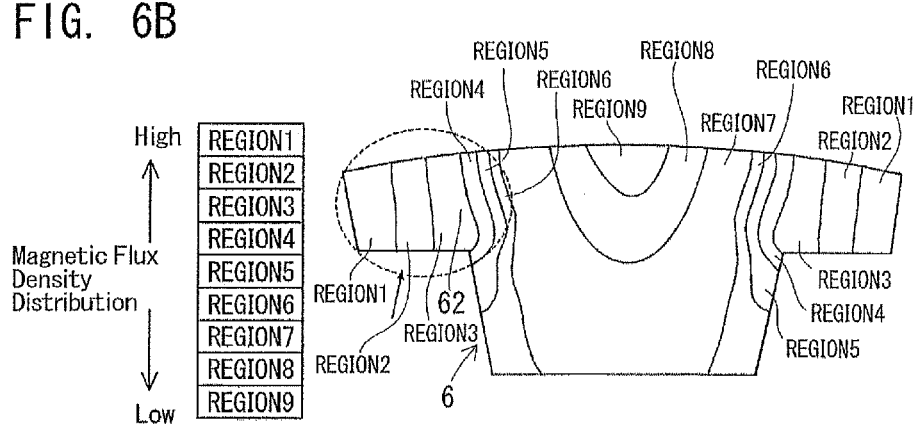
Figure 6C:
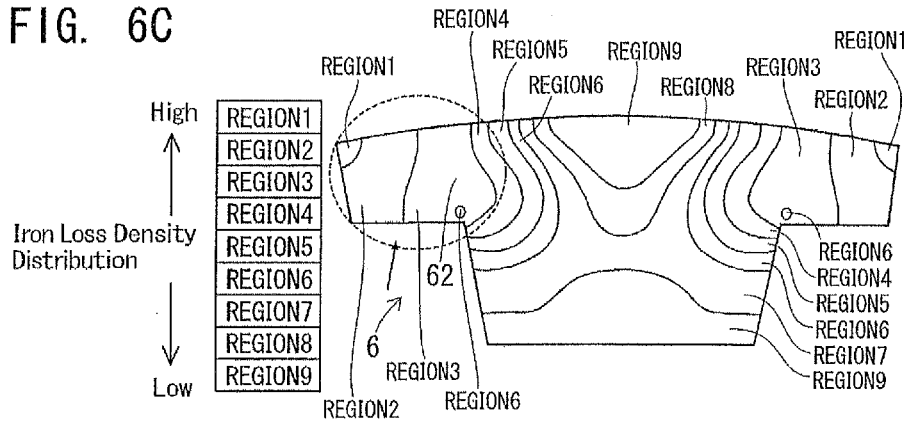

FIG. 4A depicts the relationship between: the interference V between the circular cylindrical portion 151 of the holding ring 15 and the split cores 16 according to this exemplary embodiment; and the surface pressure P. On the other hand, FIG. 4B depicts the relationship between: the interference V between the circular cylindrical portion 51 of the holding ring 5 and the split cores 6 according to a known technique; and the surface pressure P. FIG. 5A, FIG. 5B and FIG. 5C respectively depict results obtained by analyzing by a finite element method (FEM) the minimum principal stress distribution, the magnetic flux density distribution and the iron loss density distribution generated when the split cores 16 according to this exemplary embodiment are attached to the holding ring 15. FIG. 6A, FIG. 6B and FIG. 6C respectively depict results obtained by analyzing by a finite element method (FEM) the minimum principal stress distribution, the magnetic flux density distribution and the iron loss density distribution generated when the split cores 6 according to a known technique are attached to the holding ring 5. In FIG. 5A to FIG. 6C, the smaller the number appended to the region becomes, the higher the minimum principal stress, the magnetic flux density and the iron loss density become. On the other hand, the greater the number appended to the region becomes, the lower the minimum principal stress, the magnetic flux density and the iron loss density become.

The surface pressures P1 and P1 in FIG. 4A and FIG. 4B represent the minimum surface pressures required for the circular cylindrical portions 51 and 151 of the holding rings 5 and 15 to axially and circumferentially hold the split cores 6 and 16 (i.e., the minimum surface pressures required for the split cores 6 and 16 neither to circumferentially rotate with respect to the circular cylindrical portions 51 and 151 of the holding rings 5 and 15 nor to axially disengage therefrom). In addition, the surface pressures P2 and P3 represent tension limits for the circular cylindrical portions 51 and 151 of the holding rings 5 and 15 (i.e., the maximum surface pressures with which the circular cylindrical portions 51 and 151 of the holding rings 5 and 15 may be ruptured). In this exemplary embodiment, the axial cross sectional area of the circular cylindrical portion 151 of the holding ring 51 is substantially the half of the axial cross sectional area of the circular cylindrical portion 51 of the holding ring 5 according to a known technique. Therefore, the surface pressure P2 is substantially the half of the surface pressure P3. In the split cores 16 according to this exemplary embodiment, the bridge portions 161e are bent by the surface pressure P applied by the circular cylindrical portion 151 of the holding ring 15. Hence, the load applied due to the interference V onto the circular cylindrical portion 151 of the holding ring 15 according to this exemplary embodiment is smaller than the load applied due to the same interference V onto the circular cylindrical portion 51 of the holding ring 5 according to a known technique.

Therefore, according to this exemplary embodiment, even when the interference V is increased, the increase in the surface pressure P is suppressed. Specifically, according to a known technique, when the interference is set to V4, the surface pressure reaches the maximum surface pressure P31 (smaller than P3, and exemplarily 5.2 MPa). On the other hand, according to this exemplary embodiment, when the interference is set to V2, which is 1.5 times and more as great as the interference V4, the surface pressure reaches the maximum surface pressure P21 (smaller than P2, and exemplarily 2.6 MPa), which is the half of the surface pressure P31. With this arrangement, according to this exemplary embodiment, the interference is settable within the configurable range V1 to V2 (exemplarily, the range of 0.074 mm to 0.48 mm (Δ0.406 mm)), which is wider than the configurable range V3 to V4 of the interference according to a known technique (exemplarily, the range of 0.024 mm to 0.298 mm (Δ0.274 mm)). Therefore, since a tolerance for dimensional irregularities exhibited by each member of the electrical rotary machine 1 (machining tolerance) is increased as compared to that according to a known technique, the surface pressure between the circular cylindrical portion 151 of the holding ring 15 and the split cores 16 is restricted from being excessively increased.

As is clear from FIG. 5A, FIG. 5B and FIG. 5C as well as FIG. 6A, FIG. 6B and FIG. 6C, the stress generated in the back yoke portions 62 of the split cores 6 according to a known technique has resulted in an excessive stress (e.g., compressive stress of 33.4 MPa) (see, FIG. 6A). However, the stress generated in the back yoke portions 161b of the split cores 16 according to this exemplary embodiment has resulted in an excessive stress (e.g., compressive stress of 33.4 MPa) only at the bridge portions 161e (the portion enclosed in a dashed-line elongated ellipse a), and in the other portions, the stress has resulted in a reduced stress. Especially in the ends of the back yoke portions 161b (the portion enclosed in a dashed-line ellipse b), the stress has resulted in a reduced stress, for instance, a compressive stress of 3.8 MPa (see, FIG. 5A). In addition, the magnetic flux density in the ends of the back yoke portions 161b of the split cores 16 according to this exemplary embodiment (the portion enclosed in the dashed-line ellipse) (see, FIG. 5B) is reduced as compared to the magnetic flux density in the ends of the back yoke portions 62 of the split cores 6 according to a known technique (the portion enclosed in the dashed-line ellipse) (see, FIG. 6B). Further, the iron loss density in the ends of the back yoke portions 161b of the split cores 16 according to this exemplary embodiment (the portion enclosed in the dashed-line ellipse) (see, FIG. 5C) is mitigated as compared to the iron loss density in the ends of the back yoke portions 62 of the split cores 6 according to a known technique (the portion enclosed in the dashed-line ellipse) (see, FIG. 6C).

As described above, according to the electrical rotary machine 1 of the first exemplary embodiment comprises: the rotor 13 rotatably attached to the motor housing 11; and the stator 14 provided at the radially outward position to oppose to the rotor 13 and including: the holding ring 15 including the circular cylindrical portion 151 and being attached to the motor housing 11; and the plurality of split cores 16 formed by layering core plates made of electromagnetic steel plates, the split cores 16 fixed to an inner circumference of the circular cylindrical portion 151 and around each of which a coil 164 is wound; each of the split cores 16 including: a tooth portion 161a extending in the radial direction while being attached to the holding ring 15, the coil 164 being wound around the tooth portion 161a; and the back yoke portion 161b connected to the tooth portion 161a at a radially outward position and extending in a circumferential direction; the plurality of split cores 16 being fittably attached to the inner circumference of the circular cylindrical portion 151 of the holding ring 15 by press fitting or shrink fitting with an interference interposed so as to apply a surface pressure thereto, while being annularly disposed with end surfaces of the adjoining back yoke portions 161b abutting on each other, the slits 161d penetrate the back yoke portions 161b of the split cores 16 except for the circumferential ends of the back yoke portions 161b. With this arrangement, the majority of the surface pressure applied from the circular cylindrical portion 151 of the holding ring 15 is received by the bridge portions 161e while the slits 161d serve as a buffer. Therefore, in the back yoke portions 161b except for the bridge portions 161e, the surface pressure applied from the circular cylindrical portion 151 of the holding ring 15 is reduced, and the stress generated therein is reduced. Accordingly, the maintenance of the holding power of the holding ring 15 for holding the split cores 16 is compatible with the enhancement of the efficiency of the electrical rotary machine 1 by reducing the iron loss within the back yoke portions 161b, and with the prevention of the damages to the electrical rotary machine 1 by preventing the buckling of the back yoke portions 161b.

Further according to the electrical rotary machine 1 of the first exemplary embodiment, the slits 161d are formed such that the radial thicknesses of the bridge portions 161e are equal to the radial thickness of the circular cylindrical portion 151 of the holding ring 15. By making the radial thicknesses of the bridge portions 161e equal to the radial thickness of the circular cylindrical portion 151 of the holding ring 15, the bridge portions 161e receives the majority of the surface pressure applied from the circular cylindrical portion 151 of the holding ring 15. Thus, the stress generated in the back yoke portions 161b except for the bridge portions 161e is reducible, for instance, to the half of the stress that has been generated in the back yoke portions according to a known technique. Since the apparent rigidity of the split cores 16 (i.e., the rigidity with respect to the holding ring 15) is reduced, the radial thickness of the circular cylindrical portion 151 of the holding ring 15 is made smaller than the radial thickness of the circular cylindrical portion 51 according to a known technique. Consequently, the outer diameters of the split cores 16 are expansible in proportion to the reduction in the radial thickness of the circular cylindrical portion 151, and the bridge portions 161e are formable at such expanded portions.

As the downsizing of the motor housing 11 has been more and more progressed, the outer diameter of the circular cylindrical portion 151 of the holding ring 15 may not be increased more than the predetermined degree. However, even though the outer diameter of the circular cylindrical portion 151 of the holding ring 15 remains equal to the outer diameter of the circular cylindrical portion 51 according to a known technique, the rigidity of the circular cylindrical portion 151 of the holding 15 is made substantially equal to the rigidity of the bridge portions 161e by reducing the radial thickness of the circular cylindrical portion 151 of the holding ring 15 to, for instance, the half of the radial thickness of the circular cylindrical portion 51 according to a known technique, and by expanding the outer diameters of the split cores 16 by the half of the radial thickness of the circular cylindrical portion 51 according to a known technique so as to provide the bridge portions 161e at the expanded portions. With this arrangement, the majority of the surface pressure applied from the circular cylindrical portion 151 of the holding ring 15 is receivable at the bridge portions 161e. Accordingly, while the size of the electrical rotary machine 1 is maintained to be equal to the size of the electrical rotary machine according to a know technique, the areas (volumes) of the back yoke portions 161b except for the bridge portions 161e are made substantially equal to those according to a known technique, and thus the same degree of the magnetic flux flow as in a known technique is secured. Therefore, the maintenance of the holding power of the holding ring 15 for holding the split cores 16 is compatible with the enhancement of the efficiency of the electrical rotary machine 1 by reducing the iron loss within the back yoke portions 161b, and with the prevention of the damages to the electrical rotary machine 1 by preventing the buckling of the back yoke portions 161b.

Further according to the electrical rotary machine 1 of the first exemplary embodiment, the slits 161d are formed such that the ratio of the radial thicknesses of the bridge portions 161e to the radial thickness of the circular cylindrical portion 151 of the holding ring 15 is increased in proportion to the increase in the surface pressure applied from the circular cylindrical portion 151 of the holding ring 15. With this arrangement, the strength of the bridge portions 161e is increased. Thus, the majority of the surface pressure from the circular cylindrical portion 151 of the holding ring 15 is receivable at the bridge portions 161e, even if the surface pressure therefrom is increased. In this manner, the stress generated in the back yoke portion 161b except in the bridge portion 161e is reducible.

Further according to the electrical rotary machine 1 of the first exemplary embodiment, in the split cores 16, the layered electromagnetic steel plates are jointed together by being subjected to dowel swaging at the portions between the slits 161d and the outer circumference surfaces 161c of the back yoke portions 161b. This arrangement prevents the back yoke portions 161b, especially the bridge portions 161e, from buckling to be axially bent. Therefore, damages to the electrical rotary machine 1 are prevented.

Further according to the electrical rotary machine 1 of the first exemplary embodiment, in the split cores 16, the layered electromagnetic steel plates are jointed together by an adhesive at the portions between the slits 161d and the outer circumference surfaces 161c of the back yoke portions 161b. Even when the bridge portions 161e are radially so thin that no dowel swaging is possible, this arrangement prevents the back yoke portions 161b, especially the bridge portions 161e, from buckling to be axially bent. Therefore, damages to the electrical rotary machine 1 are prevented.

Further according to the electrical rotary machine 1 of the first exemplary embodiment, the slits 161d are formed at least in the circumferentially central portions of the back yoke portions 161b such that the slits 161d are longitudinal in the circumferential direction. With this arrangement, the majority of the surface pressure applied from the circular cylindrical portion 151 of the holding ring 15 is received by the bridge portions 161e while the slits 161d serve as a buffer. Therefore, in the back yoke portions 161b except for the bridge portions 161e, the surface pressure applied from the circular cylindrical portion 151 of the holding ring 15 is reduced, and the stress generated therein is reduced. Accordingly, the maintenance of the holding power of the holding ring 15 for holding the split cores 16 is compatible with the enhancement of the efficiency of the electrical rotary machine 1 by reducing the iron loss within the back yoke portions 161b, and with the prevention of the damages to the electrical rotary machine 1 by preventing the buckling of the back yoke portions 161b.

Further according to the electrical rotary machine 1 of the first exemplary embodiment, the slits 161d are formed such that the circumferential lengths thereof are equal to or greater than circumferential lengths of the teeth portion 161a. The longer the slits 161d are in the circumferential direction, the less surface pressure is applied to the back yoke portions 161b except for the bridge portions 161e from the circular cylindrical portion 151 of the holding ring 15. In this manner, the stress generated therein is reduced. Accordingly, the iron loss within the back yoke portions 161b is further reduced, and the efficiency of the electrical rotary machine 1 is thus greatly enhanced. In addition, the buckling of the back yoke portions 161b is prevented, thereby preventing the damages to the electrical rotary machine 1.

Further according to the electrical rotary machine 1 of the first exemplary embodiment, the slits 161d penetrate the back yoke portions 161b at the periphery of the outer circumference surface 161c of the back yoke portions 161b of the split cores 16. With this arrangement, the surface pressure applied from the circular cylindrical portion 151 of the holding ring 15 is received only by the bridge portions 161e provided to the periphery of the outer circumference surface 161c of the back yoke portions 161b. Therefore, in the major portions of the back yoke portions 161b, the surface pressure applied from the circular cylindrical portion 151 of the holding ring 15 is reduced, thereby reducing the stress generated therein. Accordingly, the maintenance of the holding power of the holding ring 15 for holding the split cores 16 is compatible with the enhancement of the efficiency of the electrical rotary machine 1 by reducing the iron loss within the back yoke portions 161b, and with the prevention of the damages to the electrical rotary machine 1 by preventing the buckling of the back yoke portions 161b.

In the next description, an electrical rotary machine according to a second exemplary embodiment of the invention will be described. The electrical rotary machine according to the second exemplary embodiment basically has the same configuration as the electrical rotary machine 1 according to the first exemplary embodiment depicted in FIG. 1, but differs from the electrical rotary machine 1 according to the first exemplary embodiment in the configuration of the split cores 16. In the following description, the same components as in the electrical rotary machine 1 according to the first exemplary embodiment will be referenced by the same reference signs, the detailed description of which will be omitted.

Figure 7:
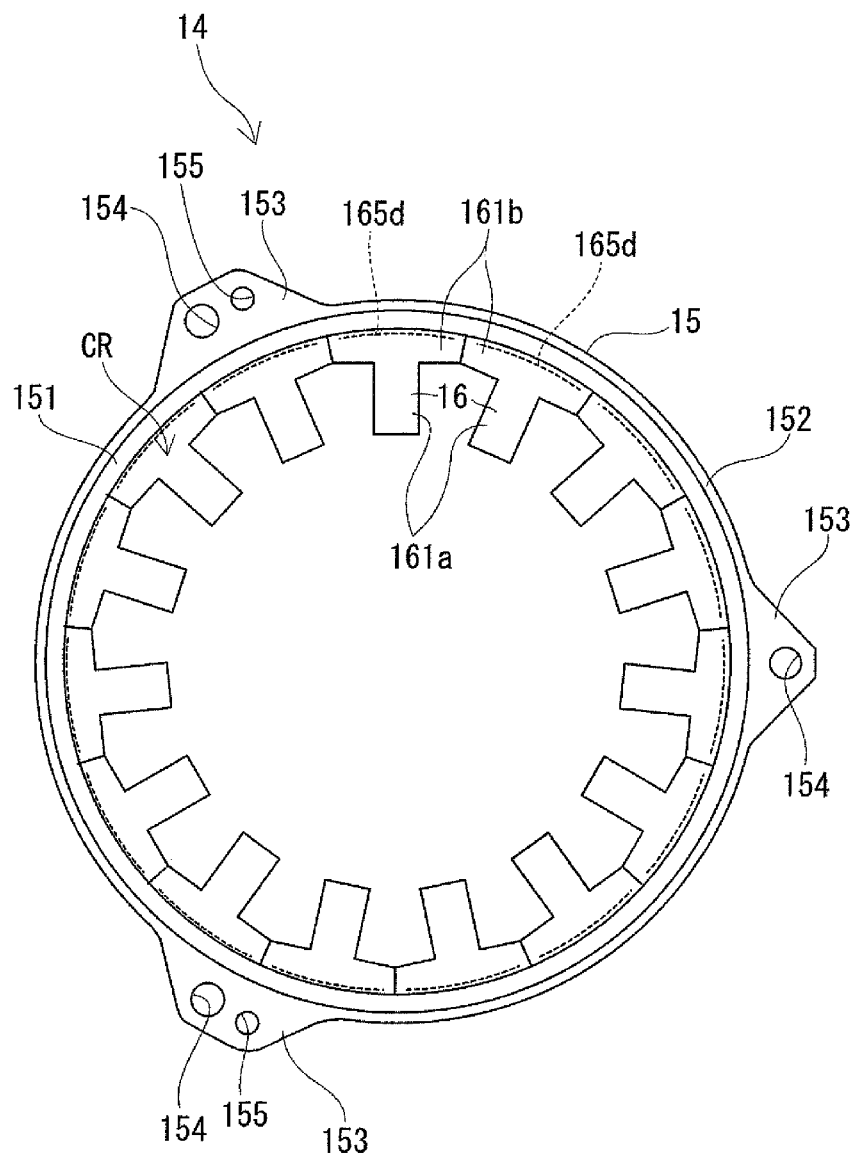
FIG. 7 is a top view depicting a stator of the electrical rotary machine according to the second exemplary embodiment.

As depicted in FIG. 7, the split cores 16 each radially extend while attached to the holding ring 15, and each have: the tooth portion 161a around which the coil 164 is wound; and the back yoke portion 161b connected to the tooth portion 161a at a radially outward position and extending in the circumferential direction (see, FIG. 7). With the above arrangement, the split cores 16 each exhibit substantially a T shape. The split cores 16 attached to the holding ring 15 are annularly juxtaposed such that the back yoke portions 161b of the adjoining pairs thereof abut on each other at their ends, thereby forming the core line CR.

The tooth portion 161a is mounted with the pair of bobbins 162 and 163 such that the bobbins 162 and 163 are fittably engaged with each other while surrounding the outer circumference of the tooth portion 161a. Around the bobbins 162 and 163, the coil 164 for use in generating rotating magnetic field is wound. The coil 164 wound around the tooth portion 161a is connected to an external inverter via a bus ring (not depicted). In the electrical rotary machine 1 having the above structure, a rotating magnetic field is generated in the stator 14 by feeding to the coil 164, for instance, three-phase alternating current, and the rotor 13 is rotated with respect to the stator 14 by the attractive force or the repulsive force generated from the rotating magnetic field.

Figure 8:
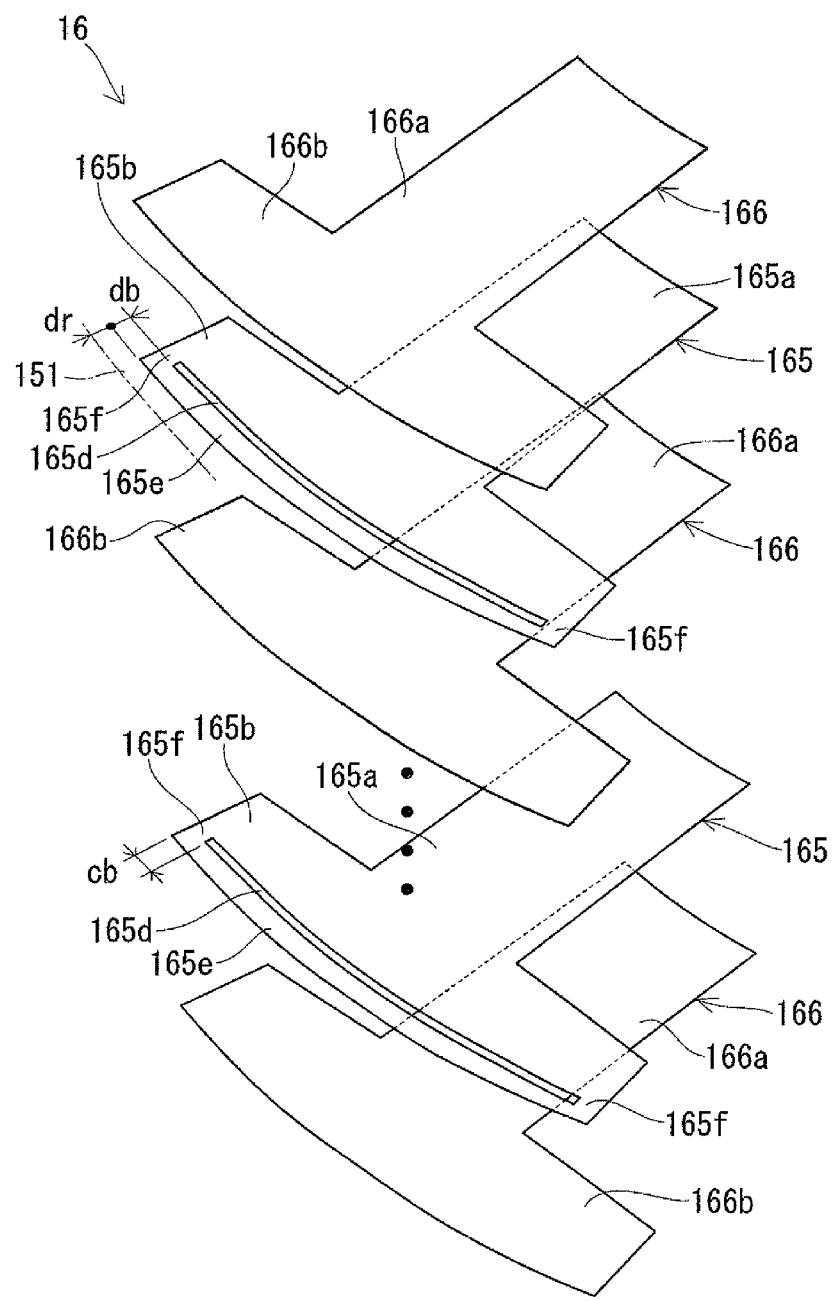
FIG. 8 is an exploded perspective view depicting a single split core included in the stator depicted in FIG. 7.

As depicted in FIG. 8, each of the split cores 16 is prepared by layering two differently shaped silicon steel plates of a first core plate 165 and a second core plate 166 alternately on the basis of, for instance, one first core plate 165 by one second core plate 166, or on the basis of a predetermined plurality of first core plates 165 by a predetermined plurality of second core plates 166. The first core plate 165 has a slit 165d formed at least in the circumferentially central portion of a first back yoke portion 165b such that the slit 165d becomes longitudinal in the circumferential direction. Specifically, in the first core plate 165, an outer circumference periphery, which is located more radially inward by a predetermined distance than an outer circumference 165c of the portion included in the back yoke portion 161b of the split core 16 (hereinafter referred to as a first back yoke portion 165b), is provided with the slit 165d that extends in the circumferential direction except for either circumferential end of the first back yoke portion 165b and axially penetrates the first back yoke portion 165b. The slit 165d is formed such that the circumferential length thereof is equal to or greater than a circumferential length of the first tooth portion 165a of the first core plate 165.

In the second core plate 166, the portion included in the back yoke portion 161b of the split core 16 (hereinafter referred to as a second back yoke portion 166b) is not provided with an arrangement equivalent to the slit 165d.

The portion that extends from the slit 165d to the outer circumference 165c of the first back yoke portion 165b (i.e., bridge portion 165e) receives the surface pressure applied from the circular cylindrical portion 151 of the holding ring 15 while the slit 165d serves as a buffer (see, FIG. 7). Thus, when the first core plate(s) 165 and the second core plate(s) 166 respectively of the same numbers are to be layered, in order to, for instance, halve the stress generated in the first back yoke portion 165b except for the bridge portion 165e, the distance from the slit 165d to the outer circumference 165c of the first back yoke portion 165b (i.e., a radial thickness db of the bridge portion 165e) is set to become twice as great as the distance from the inner circumference of the circular cylindrical portion 151 of the holding ring 15 to the outer circumference of the same (i.e., the thickness dr of the circular cylindrical portion 151 of the holding ring 15).

In addition, by forming the slit 165d so that the ratio of the radial thickness db of the bridge portion 165e to the thickness dr of the circular cylindrical portion 151 of the holding ring 15 is increased, which increases the strength of the bridge portion 165e, the surface pressure applied from the circular cylindrical portion 151 of the holding ring 15 is receivable at the bridge portion 165e, even if the surface pressure therefrom is increased. In this manner, the stress generated in the first back yoke portion 165b except in the bridge portion 165e is reducible.

The slit 165d is configured such that portions that extend from ends of the slit 165d to ends of the first back yoke portion 165b (hereinafter referred to as bridge leg portions 165f) are not ruptured by a running torque applied onto the split cores 16 when the electrical rotary machine 1 is rotated or by an axial force applied onto the split cores 16 when the vehicle have made, for instance, a lateral collision. In other words, circumferential lengths cb of the bridge leg portions 161f are determined based on the above-described running torque and axial force. When the width of the slit 165d is smaller than the twice of the thickness (t) of the steel plate (e.g., t=0.3 mm, and the slit width is smaller than 0.6 mm), the slit 165d needs to be formed by etching or lasering. However, the width of the slit 165d, which is exemplarily set in a range of 0.6 mm to 0.8 mm, is relatively great and thus formed by pressing. The shape of the slit 165d provided to the first back yoke portion 165b is not limited to the one depicted in FIG. 8, but may be any other shape as long as the slit 165d extends in the circumferential direction in the first back yoke portion 165b.

Figure 9:
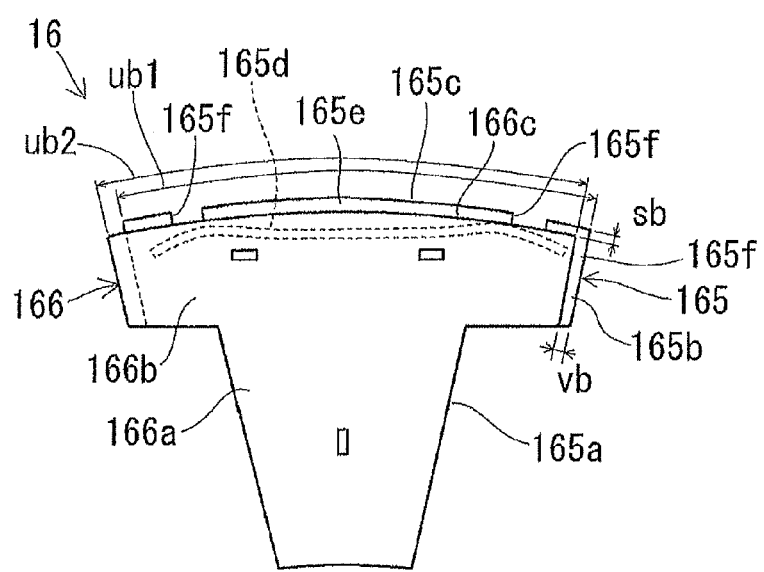
FIG. 9 is a top view depicting a first core plate and a second core plate included in the split core depicted in FIG. 8.

As depicted in FIG. 9, in the split core 16, the first core plate 165 is configured such that the outer circumference 165c of the first back yoke portion 165b of the same first core plate 165 protrudes radially outward from an outer circumference 166c of the second back yoke portion 166b of the second core plate 166. The length of the protrusion (i.e., a distance sb from the outer circumference 165c of the first back yoke portion 165b to the outer circumference 166c of the second back yoke portion 166b) is set to be equal to or greater than the interference between the split core 16 and the circular cylindrical portion 151 of the holding ring 15.

Figure 10:
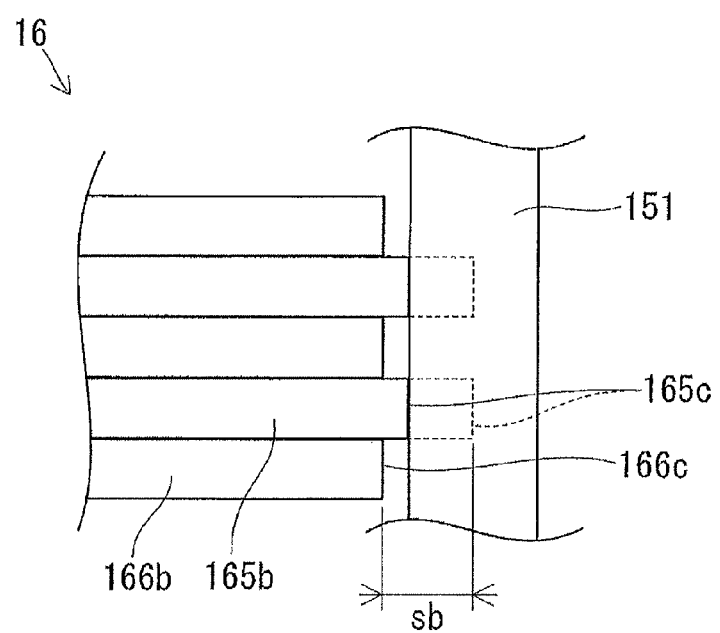
FIG. 10 is a lateral view depicting a part of the split core depicted in FIG. 8.

With this arrangement, as depicted in FIG. 10, the plurality of split cores 16 is fittably attached to the circular cylindrical portion 151 of the holding ring 15 while the outer circumferences 165c of the first back yoke portions 165b protrude radially outward by the distance sb (i.e., distance equal to or greater than the interference) from the outer circumferences 166c of the second back yoke portions 166b. Thus, the outer circumferences 166c of the second back yoke portions 166b do not abut on the inner circumference of the circular cylindrical portion 151 of the holding ring 15, and only the outer circumferences 165c of the first back yoke portions 165b abut on the inner circumference of the circular cylindrical portion 151 of the holding ring 15.

Further, as depicted in FIG. 9, in the split core 16, while the portion of the first core plate 165 included in the tooth portion 161a of the split core 16 (hereinafter referred to as a first tooth portion 165a) has the same shape as the portion of the second core plate 166 included in the tooth portion 161a of the split core 16 (hereinafter referred to as a second tooth portion 166a), the first back yoke portion 165b of the first core plate 165 is circumferentially displaced by a predetermined length vb from the second back yoke portion 166b of the second core plate 166 substantially with no change to either length ub1 or ub2 of the outer circumference 165c or 166c.

Figure 11:
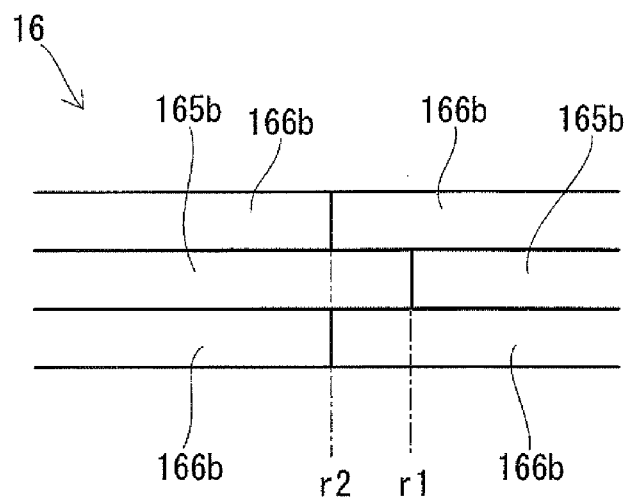
FIG. 11 is a view depicts joint portions of adjoining split cores.

Accordingly, as depicted in FIG. 11, in the plurality of split cores 16, the first core plates 165 and the second core plates 166 are alternately layered while an abutment position r1 at which circumferential end surfaces of the first back yoke portions 165b of the first core plates 165 included in each adjoining pair of split cores 16 are in abutment on each other is circumferentially displaced from a joint position r2 at which circumferential end surfaces of the second back yoke portions 166b of the second core plates 166 included in each adjoining pair of split cores 16 are jointed together. With this configuration, the plurality of split cores 16 is fittably attached to the circular cylindrical portion 151 of the holding ring 15. The circumferential end surfaces of the adjoining first back yoke portions 165b abut on each other while being sandwiched by the circumferential end surfaces of the second back yoke portions 166b. The circumferential end surfaces of the adjoining second back yoke portions 166b may be lightly jointed together, or may alternatively be jointed together with a slight clearance interposed therebetween.

Figure 12:
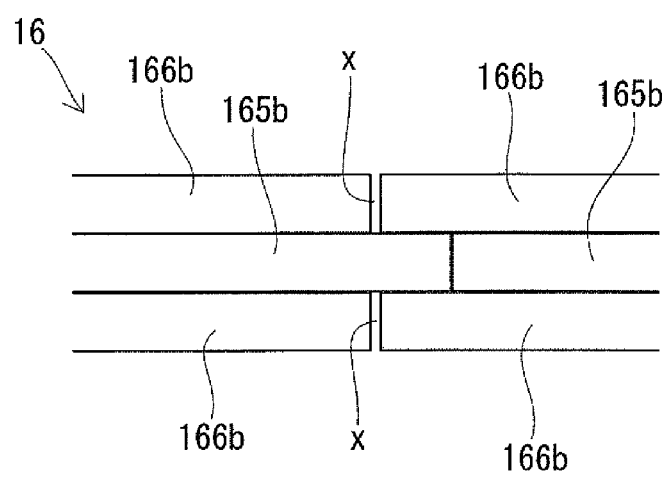
FIG. 12 is a view depicts another example of the joint portions of the adjoining split cores.

Further alternatively, the second core plate 166 may be configured such that the length ub2 of the outer circumference 166c of the second back yoke portion 166b of the same second core plate 166 is slightly shorter than the length ub1 of the outer circumference 165c of the first back yoke portion 165b of the first core plate 165. With such arrangement employed, as depicted in FIG. 12, in the plurality of split cores 16, the first core plates 165 and the second core plates 166 are alternately layered while: the circumferential end surfaces of the first back yoke portions 165b of the first core plates 165 included in each adjoining pair of split cores 16 are in abutment on each other; and the circumferential end surfaces of the second back yoke portions 166b of the second core plates 166 included in each adjoining pair of split cores 16 are separated from each other by clearances X.

Figure 13:
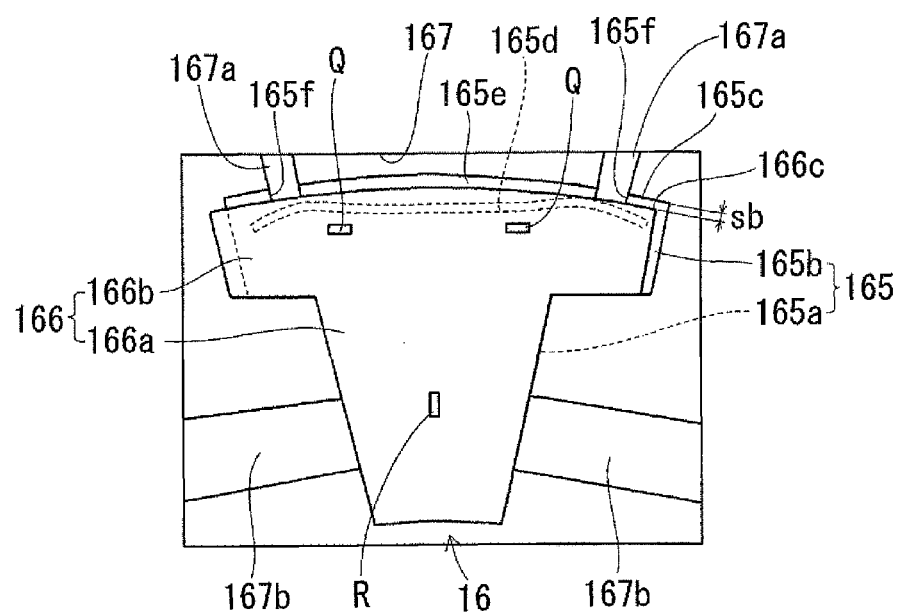
FIG. 13 is a top view depicts how the split core depicted in FIG. 8 is formed in a die.

As depicted in FIG. 13, each split core 16 is formed such that the first core plate 165 and the second core plate 166, which are respectively prepared by punching electromagnetic steel plates by pressing, are sequentially layered while being positioned in a die 167, and the first core plate 165 and the second core plate 166 are jointed together by dowel swaging. As described above, the bridge portion 165e is applied with the surface pressure from the circular cylindrical portion 151 of the holding ring 15 while the slit 165d serves as a buffer. However, since the bridge portion 165e of the first core plate 165 is sandwiched by the second core plates 166 in each split core 16, the buckling of the bridge portion 165e due to the compressive load is prevented (i.e., the bridge portion 165e is prevented from being axially bent due to the compressive load).

Accordingly, when each split core 16 is formed in the die 167, by employing the second core plate 166 having no slit 165d at least as the lowermost layered plate and the uppermost layered plate, the first core plate 165 in which the bridge portion 165e (i.e., the portion prone to the buckling) is provided by the slit 165d is not disposed at either end of the split core 16 (i.e., the portion prone to the buckling). With this arrangement, the buckling of the bridge portion 165e is prevented. For the reason described above, there is no need to reinforce the strength of the bridge portion 165e by subjecting the same to dowel swaging. In each split core 16, the first and second core plates 165 and 166 are jointed together by dowel swaging at two circumferential positions Q located in the first and second back yoke portions 165b and 166b radially more inward than the slit 165d, as well as at a single position R located at substantially the center of the first and second teeth portion 165a and 166a.

Further, in the first core plate 165, since the outer circumference 165c of the first back yoke portion 165b protrudes radially outward by the distance sb from the outer circumference 166c of the second back yoke portion 166b, it is difficult to position the second core plate 166 with respect to the first core plate 165 in the die 167. Accordingly, the outer circumference 165c of the first back yoke portion 165b of the first core plate 165 is provided with two (or three) cutouts 165f for use in positioning the second core plate 166 at the time of layering, and the cutouts 165f are formed to reach the outer circumference 166c of the second back yoke portion 166b of the second core plate 166.

In addition, the die 167 includes: two (or three) first protrusions 167a that, in order to serve as positioning members for positioning the second core plate 166, enter the cutouts 165f to abut on the outer circumferences 165c and 166c of the first and second back yoke portions 165b and 166b; and two second protrusions 167b that, in order to serve as positioning members for positioning the second core plate 166, abut on circumferential ends of the first and second teeth portion 165a and 166a. When the outer circumference 166c of the second back yoke portion 166b of the second core plate 166 is also provided with slight cutouts at positions corresponding to the cutouts 165f, the second core plate 166 is positionable with respect to the first core plate 165 in the die 167 with enhanced positioning accuracy.

As described above, the plurality of split cores 16 is attached to the inner circumference of the circular cylindrical portion 151 by shrink fitting. The holding ring 15 is heated up to a predetermined temperature such that the inner diameter of the holding ring 15 is expanded. By bringing the back yoke portions 161b of the split cores 16 into abutment on the heated circular cylindrical portion 151, the split cores 16 are inserted in the circular cylindrical portion 151 to be annularly juxtaposed therein. After the split cores 16 are inserted in the circular cylindrical portion 151, the holding ring 15 is cooled down and shrunk, thereby firmly holding the split cores 16 each.

Alternatively, the split cores 16 may be attached to the inner circumference of the holding ring 15 by press fitting under a normal temperature. When the split cores 16 are attached by press fitting to the inner circumference of the holding ring 15 for holding by the holding ring 15, an adhesive may be applied between the split cores 16 and the circular cylindrical portion 151 so as to increase the holding power of the holding ring 15. The holding ring 15 attached with the split cores 16 is fixed to the motor housing 11. After the attachment flanges 153 are brought into abutment on the bosses 112 of the motor housing 11, the attachment bolts 17 are inserted into the attachment holes 154 and screwed into the bosses 112. In this manner, the attachment flanges 153 are attached to the motor housing 11.

Figure 14A:
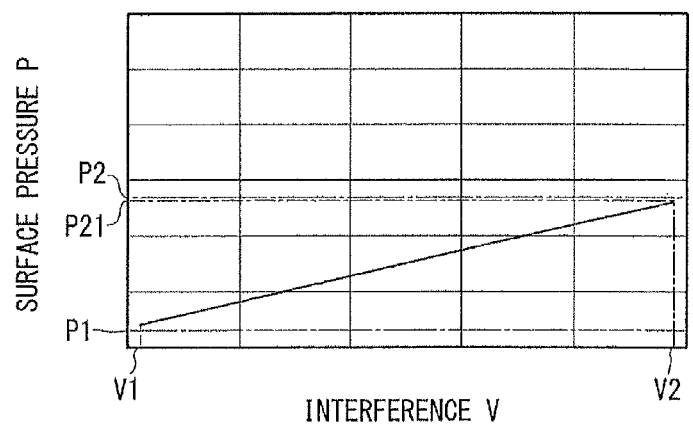
FIG. 14A is a view depicts a relationship between: an interference between a circular cylindrical portion of a holding ring and the split cores of the electrical rotary machine according to this exemplary embodiment; and a surface pressure.
Figure 14B:
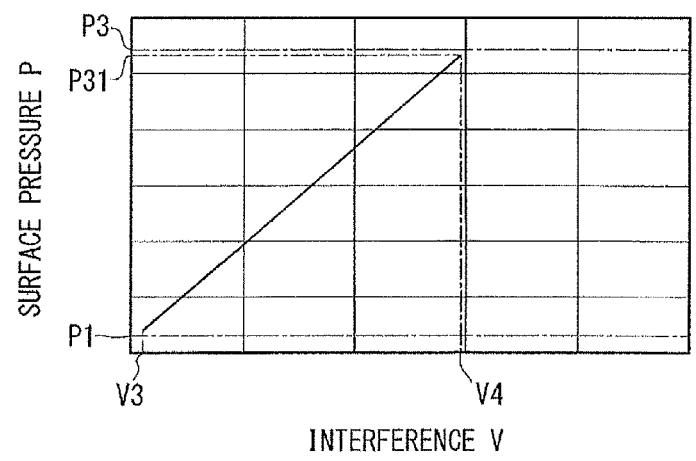
FIG. 14B is a view depicts a relationship between: an interference between a circular cylindrical portion of a holding ring and split cores of an electrical rotary machine according to a known technique; and a surface pressure.
Figure 15A:
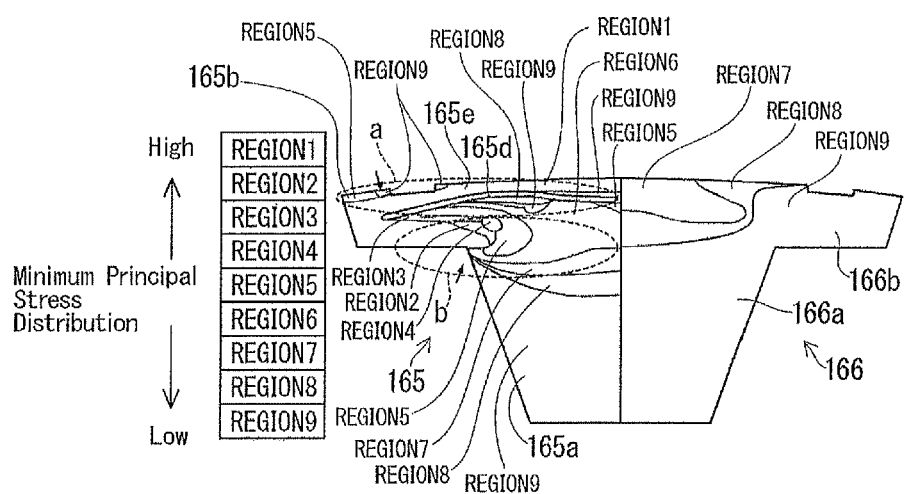
FIG. 15A is a view depicts results obtained by analyzing by a finite element method (FEM) the minimum principal stress distribution generated when the split cores of the electrical rotary machine according to this exemplary embodiment are attached to the holding ring.
Figure 15B:
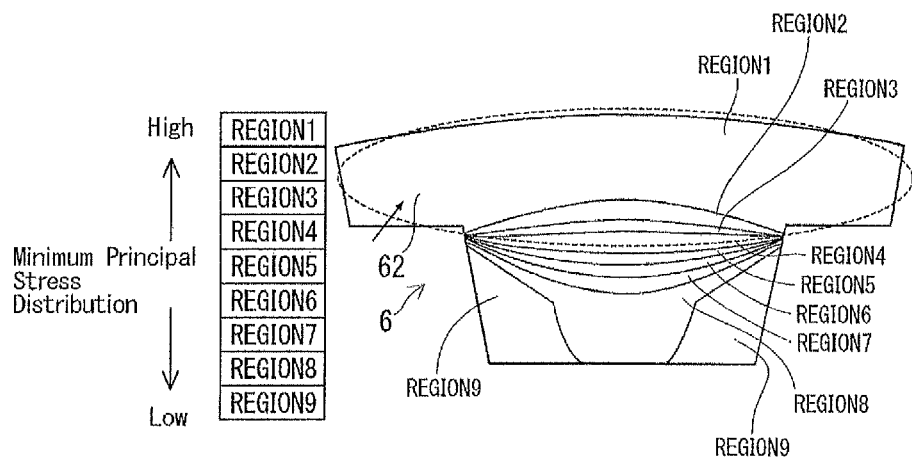
FIG. 15B is a view depicts results obtained by analyzing by a finite element method (FEM) the minimum principal stress distribution generated when split cores of an electrical rotary machine according to a known technique are attached to a holding ring.
Figure 16:
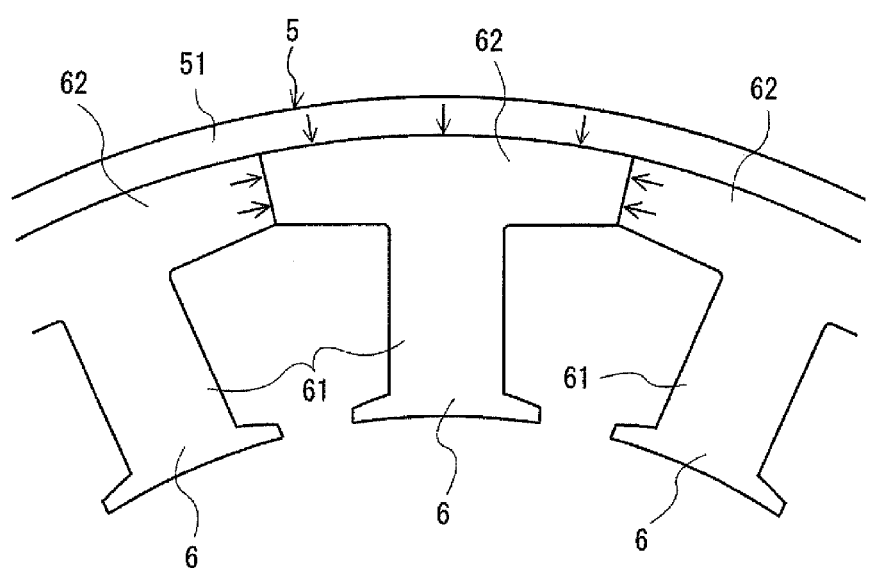
FIG. 16 is a diagram for schematically explaining a mechanism through which a stress is generated in split cores of an electrical rotary machine.

FIG. 14A depicts the relationship between: the interference V between the circular cylindrical portion 151 of the holding ring 15 and the split cores 16 according to this exemplary embodiment; and the surface pressure P. On the other hand, FIG. 14B depicts the relationship between: the interference V between the circular cylindrical portion 51 of the holding ring 5 and the split cores 6 according to a known technique; and the surface pressure P. FIG. 15A depicts results obtained by analyzing by a finite element method (FEM) the minimum principal stress distribution generated when the split cores 16 are attached to the holding ring 15 according to this exemplary embodiment. The left half of FIG. 15A depicts the minimum principal stress distribution in the first core plate 165 while the right half thereof depicts the minimum principal stress distribution in the second core plate 166. FIG. 15B depicts results obtained by analyzing by a finite element method (FEM) the minimum principal stress distribution generated when the split cores 6 according to a known technique are attached to the holding ring 5. In FIG. 15, the smaller the number appended to the region becomes, the higher the minimum principal stress becomes. On the other hand, the greater the number appended to the region becomes, the lower the minimum principal stress becomes.

The surface pressures P1 and P1 in FIG. 14A and FIG. 14B represent the minimum surface pressures required for the circular cylindrical portions 51 and 151 of the holding rings 5 and 15 to circumferentially and axially hold the split cores 6 and 16 (i.e., the minimum surface pressures required for the split cores 6 and 16 neither to circumferentially rotate with respect to the circular cylindrical portions 51 and 151 of the holding rings 5 and 15 nor to axially disengage therefrom). In addition, the surface pressures P2 and P3 represent tension limits for the circular cylindrical portions 51 and 151 of the holding rings 5 and 15 (i.e., the maximum surface pressures with which the circular cylindrical portions 51 and 151 of the holding rings 5 and 15 may be ruptured). In this exemplary embodiment, the axial cross sectional area of the circular cylindrical portion 151 of the holding ring 51 is substantially the half of the axial cross sectional area of the circular cylindrical portion 51 of the holding ring 5 according to a known technique. Therefore, the surface pressure P2 is substantially the half of the surface pressure P3. In the split cores 16 according to this exemplary embodiment, the bridge portions 165e are bent by the surface pressure P applied by the circular cylindrical portion 151 of the holding ring 15. Hence, the load applied due to the interference V onto the circular cylindrical portion 151 of the holding ring 15 according to this exemplary embodiment is smaller than the load applied due to the same interference V onto the circular cylindrical portion 51 of the holding ring 5 according to a known technique.

According to this exemplary embodiment, even when the interference V is increased, the increase in the surface pressure P is suppressed. Specifically, according to a known technique, when the interference is set to V4, the surface pressure reaches the maximum surface pressure P31 (smaller than P3). On the other hand, according to this exemplary embodiment, when the interference is set to V2, which is 1.5 times or more as great as the interference V4, the surface pressure reaches the maximum surface pressure P21 (smaller than P2), which is the half of the surface pressure P31. With this arrangement, according to this exemplary embodiment, the configurable range V1 to V2 of the interference is made wider than the configurable range V3 to V4 of the interference according to a known technique. Therefore, since a tolerance for dimensional irregularities exhibited by each member of the electrical rotary machine 1 (machining tolerance) is increased as compared to that according to a known technique, the surface pressure between the circular cylindrical portion 151 of the holding ring 15 and the split cores 16 is restricted from being excessively increased.

As is clear from FIG. 15A and FIG. 15B, the stress generated in the back yoke portions 62 of the split cores 6 according to a known technique has resulted in an excessive stress (compressive stress) (see, FIG. 15B). However, the stress generated in the back yoke portions 161b of the split cores 16 according to this exemplary embodiment has resulted in an excessive stress (compressive stress) only at the bridge portions 165e of the first core plates 165 (the portion enclosed in a dashed-line elongated ellipse a), and in the other portions, the stress has resulted in an extremely reduced stress (compressive stress). Especially in the central portions of the first back yoke portions 165b of the first core plates 165 (the portion enclosed in a dashed-line ellipse b), and the second teeth portion 166a and the second back yoke portions 166b of the second core plates 166, the stress has resulted in a extremely reduced stress (see, FIG. 15A). Accordingly, the iron loss in the back yoke portions 161b of the split cores 16 according to this exemplary embodiment is reduced as compared to the iron loss in the back yoke portions 62 of the split cores 6 according to a known technique.

As described above, according to the electrical rotary machine 1 of the second exemplary embodiment, the split cores 16 are formed by layering the plurality of first core plates 165 and the plurality of second core plates 166 in a predetermined order. In addition, the first core plates 165 are formed such that the outer circumferences 165c of the same first core plates 165 protrude radially outward from the outer circumferences 166c of the second core plates 166. Further, the slits 165d extend in the first back yoke portions 165b of the first core plates 165 except for either circumferential ends of the first back yoke portions 165b.

With this arrangement, the surface pressure from the circular cylindrical portion 151 of the holding ring 15 is received only by the first back yoke portions 165b of the first core plates 165, which protrude from the second back yoke portions 166b of the second core plates 166. Accordingly, since the surface pressure applied from the circular cylindrical portion 151 of the holding ring 15 is received by the bridge portions 165e while the slits 165d formed in the first core plates 165 serve as a buffer, the surface pressure applied to the first back yoke portions 165b except for the bridge portions 165e from the circular cylindrical portion 151 of the holding ring 15 is reduced, and thus the stress generated therein is reduced.

Further, since the first core plates 165 to be applied with the surface pressure are fixed to the holding ring 15 while being sandwiched by the second core plates 166 to be applied with no surface pressure, the movement of the bridge portions 165e in the axial direction is suppressed. Thus, even without fixing the bridge portions 165e together with use of dowel swaging or adhesion, the buckling of the bridge portions 165e is prevented (i.e., the bridge portions 165e are prevented from being bent in the axial direction). Accordingly, the maintenance of the holding power of the holding ring 15 for holding the split cores 16 is compatible with the enhancement of the efficiency of the electrical rotary machine 1 by reducing the iron loss within the back yoke portions 161b, and with the prevention of the damages to the electrical rotary machine 1 by preventing the buckling of the back yoke portions 161b.

Further according to the electrical rotary machine 1 of the second exemplary embodiment, the slits 165d are formed such that the radial thicknesses of the bridge portions 165e are twice as great as the radial thickness of the circular cylindrical portion 151 of the holding ring 15. The bridge portions 165e are applied with the surface pressure from the circular cylindrical portion 151 of the holding ring 15. However, when the first core plate(s) 165 and the second core plate(s) 166 respectively of the same numbers are to be layered, by setting the radial thicknesses of the bridge portions 165e to be twice as great as the radial thicknesses of the circular cylindrical portion 151 of the holding ring 15, the stress generated in the first back yoke portions 165b except for the bridge portions 165e is reducible to, for instance, the half of the stress generated in the back yoke portions according to a known technique. Since the apparent rigidity of the split cores 16 (i.e., the rigidity with respect to the holding ring 15) is reduced, the radial thickness of the circular cylindrical portion 151 of the holding ring 15 is made smaller than the radial thickness of the circular cylindrical portion 51 according to a known technique. Consequently, the outer diameters of the split cores 16 are expansible in proportion to the reduction in the radial thickness of the circular cylindrical portion 151, and the bridge portions 165e are formable at such expanded portions.

As the downsizing of the motor housing 11 has been more and more progressed, the outer diameter of the circular cylindrical portion 151 of the holding ring 15 may not be increased more than the predetermined degree. However, even though the outer diameter of the circular cylindrical portion 151 of the holding ring 15 remains equal to the outer diameter of the circular cylindrical portion 51 according to a known technique, the rigidity of the circular cylindrical portion 151 of the holding 15 is made substantially equal to the rigidity of the bridge portions 165e by reducing the radial thickness of the circular cylindrical portion 151 of the holding ring 15 to, for instance, the half of the radial thickness of the circular cylindrical portion 51 according to a known technique, and by expanding the outer diameters of the split cores 16 by the half of the radial thickness of the circular cylindrical portion 51 according to a known technique so as to provide the bridge portions 165e having the thicknesses twice as great as the radial thickness of the circular cylindrical portion 51 according to a known technique. With this arrangement, the surface pressure applied from the circular cylindrical portion 151 of the holding ring 15 is receivable at the bridge portions 165e. Since the first core plates 165 having the bridge portions 165e are sandwiched by the second core plates 166 having no bridge portion 165e, even when the iron loss in the bridge portions 165e is increased by making the thicknesses of the bridge portions 165e twice as great as the radial thickness of the circular cylindrical portion 51 according to a known technique, no influence is brought to the whole iron loss. Thus, there is no particular problem. Accordingly, while the size of the electrical rotary machine 1 is maintained to be equal to the size of the electrical rotary machine according to a know technique, the areas (volumes) of the first back yoke portions 165b except for the bridge portions 165e are made substantially equal to those according to a known technique, and thus the same degree of the magnetic flux flow as in a known technique is secured. Therefore, the maintenance of the holding power of the holding ring 15 for holding the split cores 16 is compatible with the enhancement of the efficiency of the electrical rotary machine 1 by reducing the iron loss within the back yoke portions 161b, and with the prevention of the damages to the electrical rotary machine 1 by preventing the buckling of the back yoke portions 161b.

Further according to the electrical rotary machine 1 of the second exemplary embodiment, the slits 165d are formed such that the ratio of the radial thicknesses of the bridge portions 165e to the radial thickness of the circular cylindrical portion 151 of the holding ring 15 is increased in proportion to the increase in the surface pressure applied from the circular cylindrical portion 151 of the holding ring 15. With this arrangement, the strength of the bridge portions 165e is increased. Thus, the surface pressure from the circular cylindrical portion 151 of the holding ring 15 is receivable at the bridge portions 165e, even if the surface pressure therefrom is increased. In this manner, the stress generated in the first back yoke portions 165b except in the bridge portions 165e is reducible.

Further according to the electrical rotary machine 1 of the second exemplary embodiment, the first core plates 165 are formed such that the distance sb from the outer circumferences 165c of the first core plates 165 to the outer circumferences 166c of the second core plates 166 becomes equal to or greater than the interference. With this arrangement, the second back yoke portions 166b of the second core plates 166 are always free from the application of the surface pressure from the circular cylindrical portion 151 of the holding ring 15, and only the first back yoke portions 165b of the first core plates 165 receives the surface pressure. Therefore, the stress generated in the second back yoke portions 166b of the second core plates 166 is reliably reducible, and the iron loss within the second back yoke portions 166b of the second core plates 166 is reducible.

Further according to the electrical rotary machine 1 of the second exemplary embodiment, in the plurality of split cores 16, the first core plates 165 and the second core plates 166 are layered in a predetermined order while the abutment position r1 at which the circumferential end surfaces of the first back yoke portions 165b of the first core plates 165 included in each adjoining pair of split cores 16 are in abutment on each other is circumferentially displaced from a joint position r2 at which the circumferential end surfaces of the second back yoke portions 166b of the second core plates 166 included in each adjoining pair of split cores 16 are jointed together. With this configuration, the plurality of split cores 16 is fittably attached to the holding ring 15. With this arrangement, the first back yoke portions 165b of the first core plates 165 are sandwiched by the second back yoke portions 166b of the adjoining second core plates 166. Therefore, the circumferential end surfaces of the first back yoke portions 165b of the first core plates 165 are prevented from being twisted due to the abutment on the circumferential end surfaces of the second back yoke portions 166b of the adjoining second core plates 166. Accordingly, the circumferential end surfaces of the second back yoke portions 166b are reliably brought into abutment on each other.

Further according to the electrical rotary machine 1 of the second exemplary embodiment, in the plurality of split cores 16, the first core plates 165 and the second core plates 166 are layered in a predetermined order while: the circumferential end surfaces of the first back yoke portions 165b of the first core plates 165 included in each adjoining pair of split cores 16 are in abutment on each other; and the circumferential end surfaces of the second back yoke portions 166b of the second core plates 166 included in each adjoining pair of split cores 16 are separated from each other by the clearances. With this configuration, the plurality of split cores 16 is fittably attached to the holding ring 15. With this arrangement, the surface pressure from the circular cylindrical portion 151 of the holding ring 15 is hardly transmitted between the second back yoke portions 166b of the second core plates 166 included in the adjoining pairs of split cores 16. Thus, the increase in the iron loss within the second back yoke portions 166b of the second core plate 166 is prevented.

Further according to the electrical rotary machine 1 of the second exemplary embodiment, the slits 165d are formed in the first core plates 165 by pressing, and the plurality of first core plates 165 and the plurality of second core plates 166 layered are subjected to dowel swaging. When radial widths of the slits 165d are widely secured so as to ease the pressing, the bridge portions 165e may be easily buckled due to the compressive load applied from the circular cylindrical portion 151 of the holding ring 15 and easily axially bent. However, since the first core plates 165 to be applied with the surface pressure are fixed to the holding ring 15 while being sandwiched by the second core plates 166 to be applied with no surface pressure, the movement of the bridge portions 165e in the axial direction is suppressed, thereby preventing the buckling of the bridge portions 165e. As a consequence, the radial widths of the slits 165d are widely secured so as to ease the pressing. Accordingly, the slit 165d as well as protrusions and recesses at front and back surfaces of the first core plates 165 and the second core plates 166 for use in dowel swaging are formable solely through a series of pressing. Therefore, the manufacturing cost of the split cores 16 is reducible.

Further according to the electrical rotary machine 1 of the second exemplary embodiment, the outer circumferences 165c of the first core plates 165 are provided with the cutouts 165f for use in positioning the second core plates 166 at the time of layering. The cutouts 165f are formed to reach the outer circumferences 166c of the second core plates 166. The plurality of first core plates 165 and the plurality of second core plates 166 are layered in the die 167. Since the first core plates 165 are formed such that the outer circumferences 165c of the same first core plates 165 protrude radially outward from the outer circumferences 166c of the second core plates 166, only the outer circumferences 165c of the first core plates 165 abut on the inner wall of the die 167 while the outer circumferences 166c of the second core plates 166 do not abut on the inner wall of the die 167. Accordingly, it would be difficult to layer the plurality of first core plates 165 and the plurality of second core plates 166 in the die 167 with high accuracy.

However, since the cutouts 165f that reach the outer circumferences 166c of the second core plates 166 are provided to the outer circumferences 165c of the first core plates 165 for positioning the second core plates 166, by providing the inner wall of the die 167 with the first protrusions 167a as the positioning member to be fitted to the positioning cutouts 165f, the plurality of first core plates 165 and the plurality of second core plates 166 are layered with high accuracy in the die 167.

Further according to the electrical rotary machine 1 of the second exemplary embodiment, the layered split cores 16 are structured such that the second core plates 166 are layered on both ends of the split cores 16. Since the first core plates 165 are sandwiched between the second core plates 166 located at both layering ends and thus are accommodated in the inner side of the layering, the movement of the bridge portions 165e of the first core plates 165 in the axial direction is suppressed. Therefore, the buckling of the bridge portions 165e is prevented (i.e., the bridge portions 165e are prevented from being axially bent).

As described above, according to the electrical rotary machine 1 of the second exemplary embodiment, each of the split cores 16 is formed by layering the plurality of first core plates 165 and the plurality of second core plates 166 in a predetermined order. In addition, the first core plates 165 are formed such that the outer circumferences 165c of the same first core plates 165 protrude radially outward from the outer circumferences 166c of the second core plates 166. Further, the slits 165d are formed at least in the circumferentially central portion of the first back yoke portions 165b such that the slits 165d become longitudinal in the circumferential direction. With this arrangement, the surface pressure from the circular cylindrical portion 151 of the holding ring 15 is received only by the first back yoke portions 165b of the first core plates 165, which protrude from the second back yoke portions 166b of the second core plates 166. Accordingly, since the surface pressure applied from the circular cylindrical portion 151 of the holding ring 15 is received by the bridge portions 165e while the slits 165d formed in the first core plates 165 serve as a buffer, the surface pressure applied to the first back yoke portions 165b except for the bridge portions 165e from the circular cylindrical portion 151 of the holding ring 15 is reduced, and thus the stress generated therein is reduced.

Further, since the first core plates 165 to be applied with the surface pressure are fixed to the holding ring 15 while being sandwiched by the second core plates 166 to be applied with no surface pressure, the movement of the bridge portions 165e in the axial direction is suppressed. Thus, even without fixing the bridge portions 165e together with use of dowel swaging or adhesion, the buckling of the bridge portions 165e is prevented (i.e., the bridge portions 165e are prevented from being bent in the axial direction). Accordingly, the maintenance of the holding power of the holding ring 15 for holding the split cores 16 is compatible with the enhancement of the efficiency of the electrical rotary machine 1 by reducing the iron loss within the back yoke portions 161b, and with the prevention of the damages to the electrical rotary machine by preventing the buckling of the back yoke portions 161b.

Further according to the electrical rotary machine 1 of the second exemplary embodiment, the slits 165d are formed such that the circumferential lengths thereof are equal to or greater than circumferential lengths of the first teeth portion 165a of the first core plates 165. The longer the slits 165d are in the circumferential direction, the less surface pressure is applied to the first back yoke portions 165b except for the bridge portions 165e from the circular cylindrical portion 151 of the holding ring 15. In this manner, the stress generated therein is reduced. Accordingly, the iron loss within the first back yoke portions 165b is further reduced, and the efficiency of the electrical rotary machine 1 is thus greatly enhanced. In addition, the buckling of the first back yoke portions 165b is prevented, thereby preventing the damages to the electrical rotary machine 1.

Further according to the electrical rotary machine 1 of the second exemplary embodiment, the slits 165d penetrate the first back yoke portions 165b at the outer circumferential periphery of the first back yoke portions 165b of the first core plates 165. With this arrangement, the surface pressure applied from the circular cylindrical portion 151 of the holding ring 15 is received only by the bridge portions 165e provided to the outer circumferential periphery of the first back yoke portions 165b. Therefore, in the major portions of the first back yoke portions 165b, the surface pressure applied from the circular cylindrical portion 151 of the holding ring 15 is reduced, thereby reducing the stress generated therein. Accordingly, the maintenance of the holding power of the holding ring 15 for holding the split cores 16 is compatible with the enhancement of the efficiency of the electrical rotary machine 1 by reducing the iron loss within the first back yoke portions 165b, and with the prevention of the damages to the electrical rotary machine 1 by preventing the buckling of the first back yoke portions 165b.

This invention is not limited to the exemplary embodiments described above, but may be modified or expanded as described below. This invention is not only applicable to split cores formed by layering a plurality of electromagnetic steel plates, but also to split cores formed by pressure forming of magnetic metal powder.

INDUSTRIAL APPLICABILITY

The electrical rotary machine 1 according to the aspect of the invention is applicable as a motor for use in home electric appliances (e.g., synchronous motor, induction motor, direct current motor) or as a motor adapted to drive typical industrial machines.

The invention claimed is:
1. An electrical rotary machine comprising:
a rotor rotatably attached to a housing; and
a stator provided at a radially outward position to oppose to the rotor and including: a holding ring including a circular cylindrical portion and being attached to the housing; and a plurality of split cores formed by layering core plates made of electromagnetic steel plates, the split cores fixed to an inner circumference of the circular cylindrical portion and around each of which a coil is wound;
each of the split cores including: a tooth portion extending in a radial direction while being attached to the holding ring, the coil being wound around the tooth portion; and a back yoke portion connected to the tooth portion at a radially outward position and extending in a circumferential direction;
the plurality of split cores being fittably attached to the inner circumference of the circular cylindrical portion of the holding ring by press fitting or shrink fitting with an interference interposed so as to apply a surface pressure thereto, while being annularly disposed with end surfaces of the adjoining back yoke portions abutting on each other,
wherein a slit is provided at the back yoke portion of each of the split cores and penetrates therethrough except for either circumferential end of the back yoke portion,
wherein each of the split cores is formed by layering a plurality of first core plates and a plurality of second core plates in a predetermined order,
the first core plates are formed such that outer circumferences of the first core plates protrude radially outward from outer circumferences of the second core plates; and wherein
the slit is provided at the back yoke portion of each of the first core plates and penetrates therethrough except for either circumferential end of the back yoke portion.
2. The electrical rotary machine according to claim 1, wherein the slit is formed such that a distance from the slit to an outer circumference of the back yoke portion is equal to a distance from the inner circumference of the circular cylindrical portion of the holding ring to an outer circumference of the circular cylindrical portion of the holding ring.
3. The electrical rotary machine according to claim 1, wherein the slit is formed such that a ratio of the distance from the slit to the outer circumference of the back yoke portion to the distance from the inner circumference of the circular cylindrical portion of the holding ring to the outer circumference of the circular cylindrical portion of the holding ring is increased in proportion to an increase in the surface pressure.
4. The electrical rotary machine according to claim 1, wherein the layered electromagnetic steel plates are subjected to dowel swaging each other at a portion between the slit and the outer circumference of the back yoke portion in each of the split cores.

5. The electrical rotary machine according to claim 1, wherein the layered electromagnetic steel plates are jointed together by an adhesive at a portion between the slit and the outer circumference of the back yoke portion in each of the split cores.

6. The electrical rotary machine according to claim 1, wherein the first core plates are configured such that a distance from the outer circumferences of the first core plates to the outer circumferences of the second core plates is equal to or greater than the interference.

7. The electrical rotary machine according to claim 1, wherein the plurality of split cores is fittably attached to the holding ring with the first core plates and the second core plates layered in a predetermined order while an abutment position of the first core plates is circumferentially displaced from a joint position of the second core plates, the abutment position being a position at which circumferential end surfaces of the back yoke portions of the first core plates included in each adjoining pair of split cores are in abutment on each other, the joint position being a position at which circumferential end surfaces of the back yoke portions of the second core plates included in each adjoining pair of split cores are jointed together.

8. The electrical rotary machine according to claim 1, wherein the plurality of split cores is fittably attached to the holding ring with the first core plates and the second core plates layered in a predetermined order, while circumferential end surfaces of the back yoke portions of the first core plates included in each adjoining pair of split cores are in abutment on each other, and circumferential end surfaces of the back yoke portions of the second core plates included in each adjoining pair of split cores are separated from each other with a clearance.

9. The electrical rotary machine according to claim 1, wherein the slit is formed in the first core plates by pressing, and the plurality of first core plates and the plurality of second core plates layered are subjected to dowel swaging.

10. The electrical rotary machine according to claim 1, wherein the outer circumferences of the first core plates are provided with cutouts for use in positioning the second core plates when layering the second core plates, the cutouts being formed to reach the outer circumferences of the second core plates.

11. The electrical rotary machine according to claim 1, wherein the second core plates are layered on ends of the split cores in which the plurality of first core plates and the plurality of second core plates are layered in a predetermined order.

12. An electrical rotary machine comprising:
a rotor rotatably attached to a housing; and
a stator provided at a radially outward position to oppose to the rotor and including: a holding ring including a circular cylindrical portion and being attached to the housing; and a plurality of split cores formed by layering core plates made of electromagnetic steel plates, the split cores fixed to an inner circumference of the circular cylindrical portion and around each of which a coil is wound;
each of the split cores including: a tooth portion extending in a radial direction while being attached to the holding ring, the coil being wound around the tooth portion; and a back yoke portion connected to the tooth portion at a radially outward position and extending in a circumferential direction;
the plurality of split cores being fittably attached to an inner circumference of the circular cylindrical portion of the holding ring by press fitting or shrink fitting with an interference interposed so as to apply a surface pressure thereto, while being annularly disposed with end surfaces of the adjoining back yoke portions abutting on each other,
wherein each of the split cores is formed by layering a plurality of first core plates and a plurality of second core plates in a predetermined order;
the first core plates are formed such that outer circumferences of the first core plates protrude radially outward from outer circumferences of the second core plates; and
the back yoke portion of each of the first core plates is provided with a slit at least at a circumferentially central portion, the slit including a longitudinal shape in a circumferential direction.

13. The electrical rotary machine according to claim 12, wherein a length of the slit in the circumferential direction is equal to or greater than a length of the tooth portion of the first core plate in the circumferential direction.

14. The electrical rotary machine according to claim 1, wherein an outer circumferential periphery of the back yoke portion of the first core plate is provided with the slit.

\* \* \* \* \*